United States Patent
Kume et al.

(10) Patent No.: US 7,876,409 B2
(45) Date of Patent: Jan. 25, 2011

(54) LIQUID CRYSTAL DISPLAY ELEMENT

(75) Inventors: Yasuhiro Kume, Kawachinagano (JP); Takashi Kurihara, Yokohama (JP); Kazuhiko Tamai, Nabari (JP); Takaaki Okamoto, Kizugawa (JP); Shinya Saeki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 11/991,906

(22) PCT Filed: Sep. 12, 2006

(86) PCT No.: PCT/JP2006/318065

§ 371 (c)(1),
(2), (4) Date: Mar. 12, 2008

(87) PCT Pub. No.: WO2007/032347

PCT Pub. Date: Mar. 22, 2007

(65) Prior Publication Data

US 2009/0147199 A1   Jun. 11, 2009

(30) Foreign Application Priority Data

Sep. 16, 2005  (JP) .............................. 2005-271238

(51) Int. Cl.
G02F 1/1333  (2006.01)
(52) U.S. Cl. ........................................ 349/126; 349/84
(58) Field of Classification Search .................. 349/126
See application file for complete search history.

(56) References Cited

U.S. PATENT DOCUMENTS 6,141,075 A   10/2000  Ohmuro et al.
2001/0026340 A1*  10/2001  Hasegawa et al. ........... 349/123

2009/0147199 A1   6/2009  Kume et al.

FOREIGN PATENT DOCUMENTS

| JP | 09-005754 | 1/1997 |
|---|---|---|
| JP | 09-090434 | 4/1997 |
| JP | 10-123576 | 5/1998 |
| JP | 2001-042332 | 2/2001 |

(Continued)

OTHER PUBLICATIONS

Bahadur, Birendra, Liquid Crystals: Applications and Uses, 1990, World Scientific Publishing Co., vol. 1, p. 252.*

(Continued)

*Primary Examiner*—Mark A Robinson
*Assistant Examiner*—Erin D Chiem
(74) *Attorney, Agent, or Firm*—Nixon & Vanderhye P.C.

(57) ABSTRACT

In a liquid crystal display element of the present invention, the aligning capability for imparting pre-tilt angles to a liquid crystal material is imparted only to the surface of the alignment film of one of the substrates, the material layer having dielectric anisotropy includes a chiral material and a liquid crystal material with a nematic liquid crystal phase, $0.25 \leq d/p \leq 0.50$ is satisfied assuming that the thickness of the material layer having the dielectric anisotropy is d and the chiral pitch length of the liquid crystal material is p, and $1000 \times d/p \leq \Delta n \times d$ is satisfied assuming that the refractive index anisotropy of the liquid crystal material is $\Delta n$.

16 Claims, 8 Drawing Sheets

FOREIGN PATENT DOCUMENTS

| JP | 2001-264770 | 9/2001 |
| JP | 2001-343652 | 12/2001 |
| JP | 2003-149645 | 5/2003 |
| JP | 2003-255395 | 9/2003 |
| JP | 2005-181826 | 7/2005 |
| JP | 2005-234254 | 9/2005 |

OTHER PUBLICATIONS

Takahashi et a., "Electrooptical Properties of Vertically Aligned Twisted Nematic Cells with Negative Dielectric Anisotropy," *Jpn. J. Appl. Phys.*, vol. 36, Part 1, No. 6A, (1997), pp. 3531-3536.

U.S. Office Action mailed Nov. 13, 2009 in U.S. Appl. No. 11/991,793.

* cited by examiner

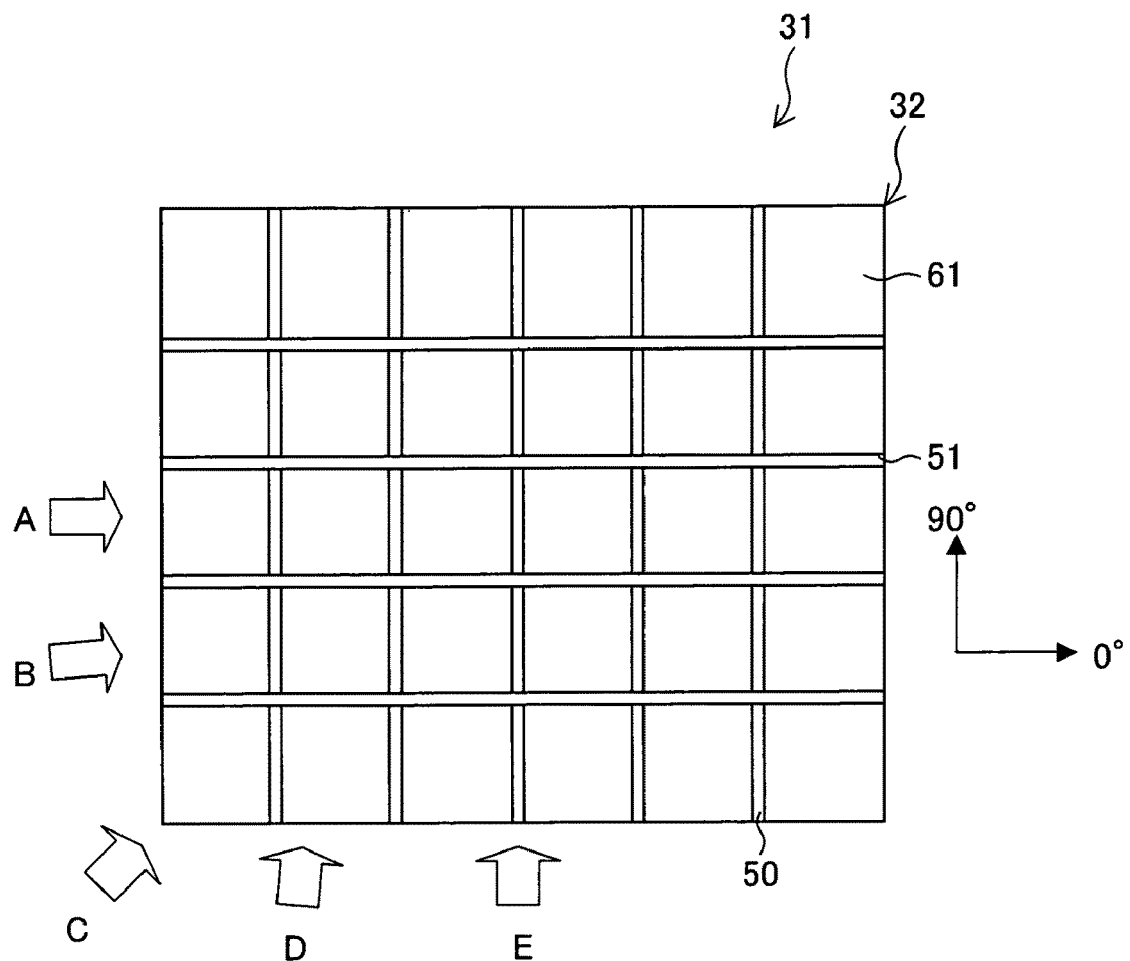

LIQUID CRYSTAL DISPLAY ELEMENT

PCT/JP2006/318065, filed 12 Sep. 2006, which designated the U.S. and claims priority to Japanese Patent Application No. 2005-271238, filed 16 Sep. 2005, the entire contents of each of which are hereby incorporated by reference.

TECHNICAL FIELD

The present invention relates to a liquid crystal display element which operates in a vertical alignment mode.

BACKGROUND ART

The advance of liquid crystal displays (LCDs) of recent date has been remarkable. LCDs have been widely used for small displays of mobile equipments, PC monitors, liquid crystal television receivers, and so on. As liquid crystal displays advance, demands for quicker response and higher contrast are increasing.

There are many types of liquid crystal display modes. Among them, a mode which primarily assures high contrast is the vertical alignment mode using liquid crystal with negative dielectric anisotropy. Under cross nicols, in a liquid crystal display in the vertical alignment mode, the longitudinal axis direction of liquid crystal molecules sandwiched between a pair of substrates is orthogonal to the substrates when no electric field is applied. The liquid crystal display is therefore in dark state. On the other hand, when an electric field orthogonal to the substrates is applied, the longitudinal axis direction of the liquid crystal molecules falls from the direction orthogonal to the substrates to the direction in parallel to the substrates. The liquid crystal display therefore becomes in bright state.

An alignment film used in the vertical alignment mode is a vertical alignment film which arranges the longitudinal axis direction of the liquid crystal molecules to be substantially orthogonal to the substrates when no electric field is applied. The vertical alignment film, however, typically cannot control the direction of tilt of the liquid crystal molecules when an electric field is applied. If no countermeasure is taken, the liquid crystal molecules fall in random directions when an electric field is applied, and the brightness is impaired due to the occurrence of disinclination. To solve this problem, various measures have conventionally been taken. Examples of the measures are as follows: a structure is provided between a pair of substrates so that the direction to which liquid crystal molecules falls in response to voltage application is regulated; a chiral material is added so that, in response to voltage application, liquid crystal molecules are arranged to fall while being twisted in a predetermined direction; and the vertical alignment film is rubbed so that the direction in which the liquid crystal molecules fall in response to electric field application is controlled.

As one type of the vertical alignment mode, there is a twisted vertical alignment mode in which, when a voltage is applied, liquid crystal molecules are twisted (i.e. the alignment vector of the liquid crystal molecules in proximity to one substrate is different from the alignment vector of the liquid crystal molecules in proximity to the other substrate.) The alignment directions of the liquid crystal molecules, for example, form an angle of 90° between the respective substrates. This twisted vertical alignment mode makes it possible to achieve a considerably high contrast.

Non-Patent Document 1 discloses a so-called vertically aligned twisted nematic liquid crystal display element. This liquid crystal display element operates in the vertical alignment mode in which liquid crystal with negative dielectric anisotropy is aligned to be substantially orthogonal to the panel surface of a liquid crystal display element, and is arranged such that the liquid crystal molecules are twisted in response to voltage application to the liquid crystal layer and only one of the alignment films has been rubbed.

[Non-Patent Document 1]

T. Takahashi et al. "Electrooptical Properties of Vertically Aligned Twisted Nematic Cells with Negative Dielectric Anisotropy", Jpn. J. Appl. Phys. Vol. 36 (1997) Part 1, No. 6A, June 1997, p. 3531-3536

DISCLOSURE OF INVENTION

However, in case where an alignment film of a display in a vertical alignment mode such as a twisted vertical alignment mode is in uniaxial alignment (e.g. the alignment film has been rubbed), liquid crystal molecules around the substrate is aligned so as to be slightly tilted from the direction orthogonal to the substrate. Also, on the surface of the substrate on the whole, the tilting angles (pre-tilt angles) of the liquid crystal molecules with respect to the plane of the substrate are different from one another to some extent.

In other words, when the alignment film is in uniaxial alignment, the surface of the alignment film is not uniform and completely in uniaxial alignment in its entirety but is irregular to some extent. Therefore, when liquid crystal molecules are sandwiched between two substrates on which the above-described alignment films are provided, respectively, the pre-tilt angles of the liquid crystal molecules with respect to the surfaces of the substrates are different to some extent, in the entirety of the surfaces of the substrates.

Differences in the pre-tilt angles result in differences in the ways of falling of the liquid crystal molecules in response to voltage application. When the ways of falling of the liquid crystal molecules in response to voltage application are different, the retardation of the liquid crystal layer is inconsistent. Such inconsistency in the retardation of the liquid crystal layer induces inconsistency in an amount of light passing through the liquid crystal display element. Consequently, differences in the pre-tilt angles result in inconsistency in an amount of light passing through the liquid crystal display element.

To put it differently, in liquid crystal molecules sandwiched between two substrates on which uniaxial-aligning alignment films are provided so as to face each other, the pre-tilt angles of the liquid crystal molecules are different and such differences in the pre-tilt angles (inconsistency in the pre-tilt angles in proximity to the alignment films) induce inconsistency in an amount of light passing through the liquid crystal display element. The inconsistency results in a variation in an amount of light passing through the surfaces of the substrates, thereby causing irregularity in image display.

For example, when the pre-tilt angles are dispersed in the range of about 3°, an amount of light passing through the liquid crystal display element varies in the range of about 60%. When the amount of the transmitted light varies in such a high degree, the variation induces irregularity in image display.

The relationship between the dispersion in pre-tilt angles and an amount of transmitted light will be discussed. FIG. 6 is a graph of voltages (horizontal axis) and light transmission (vertical axis) in a conventional liquid crystal display element, and shows how light transmission varies when 6 types of pre-tilt angles (87°, 87.5°, 88°, 88.5°, 89°, and 89.5°) are used. As shown in FIG. 6, the light transmission is varied in accordance with a pre-tilt angle (particularly when the voltages is about 3 to 4 volts). The difference between the minimum and the maximum is about 60%. In other words, the figure illustrates that, on account of the inconsistency in the pre-tilt angles, an amount of transmitted light varies about 60% and hence irregularity in image display occurs.

There have been attempts to restrain irregularity in image display in a conventional liquid crystal display in the vertical alignment mode, by eliminating the irregularity in the pre-tilt angles, i.e. by arranging the liquid crystal molecules to be uniformly tilted with respect to the planes of the substrates. However, such attempts are hardly practicable because it is in reality difficult to eliminate the irregularity in the pre-tilt angles.

In the meanwhile, in the vertical alignment mode, the aligning capability is typically imparted to films provided on the respective surfaces of the opposing substrates. In this regard, when a spacer is formed or another structure is provided, it obstructs the process of imparting the aligning capability and worsens the irregularity in the rubbing lines.

To solve this problem, it has been proposed to impart the aligning capability only to one of the films, as taught in Non-Patent Document 1. Since the rubbing process is halved in the manufacturing processes, a liquid crystal display element in which the aligning capability is imparted to only one of the substrates is advantageous in both take time and costs.

In addition to the above, Non-Patent Document 1 mentions an advantage in terms of the process, which is to reduce electrostatic stress on the substrates thanks to an arrangement such that rubbing is conducted on only one of the substrates and optical properties such as the color and threshold value of light passed through the liquid crystal display element. The document, however, mentions neither the irregularity in image display on account of the irregularity in the pre-tilt angles nor a technology to solve this disadvantage.

As explained in Non-Patent Document 1, in a liquid crystal display element in which rubbing is conducted to only one of the substrates, a variation in light transmission with respect to a variation of d/p tends to be serious as compared to a liquid crystal display element in which rubbing is conducted to both of the substrates, assuming that the thickness of a material layer (liquid crystal layer) having dielectric anisotropy is d and the chiral pitch length of the liquid crystal substances in the liquid crystal layer is p. For example, the light transmission is greatly decreased in response to the decrease in d/p.

The present invention was done to solve the problems above, and the objective of the present invention is to provide a liquid crystal display element in a twisted vertical alignment mode, which is advantageous in (i) good display properties with restrained image display irregularity thanks to the suppression of variation in an amount of transmitted light, which variation is caused by variation in pre-tilt angles of the alignment film, and (ii) high light transmission.

To achieve the objective above, a liquid crystal display element of the present invention includes a pair of substrates on whose opposing surfaces alignment films are formed, respectively; and a material layer having dielectric anisotropy, the material layer being sandwiched between said pair of substrates, aligning capability being imparted only one of the alignment films so that a liquid crystal material has pre-tilt angles, the material layer with the dielectric anisotropy including a chiral material and the liquid crystal material with a nematic liquid crystalline phase, $0.25 \leq d/p \leq 0.50$ being satisfied assuming that the thickness of the material layer is d and a chiral pitch length of the liquid crystal material is p, and $1000 \times d/p \leq \Delta n \times d$ being satisfied assuming that refractive index anisotropy of the liquid crystal material is $\Delta n$.

In the arrangement above, on the opposing surfaces of the respective substrates which are paired, alignment films are formed. The aligning capability is imparted to only the surface of the alignment film on one of the substrates. Between the pair of substrates, a material layer having dielectric anisotropy is sandwiched. The material layer with dielectric anisotropy includes a chiral material and a liquid crystal material with a nematic liquid crystal phase. Because the chiral material is included, the liquid crystal material in the material layer with the dielectric anisotropy is twisted when a voltage is applied to the material layer, in the direction substantially orthogonal to the material layer.

While in the conventional arrangement the addition of chiral material intends to control the direction of falling of liquid crystal, the addition of chiral material in the present invention intends to control the retardation ($\Delta n \times d$) at the micro level, in the thickness direction (i.e. in the z-axis direction) in the liquid crystal layer. Therefore, for example, in case where a voltage is applied to the material layer having the dielectric anisotropy so that the alignment of the liquid crystal material is changed, it is possible to compensate the disturbance in the retardation on account of difference in the degree of rise among liquid crystal molecules due to the dispersion of pre-tilt angles at the boundary face of the alignment film. As a result, it is possible to restrain defective image display due to the dispersion of the pre-tilt angles. The following will explain how defective image display is restrained in a liquid crystal display element in which aligning capability is imparted only one of the substrates.

That is to say, in a conventional arrangement, two substrates sandwiching a liquid crystal material have respective alignment films for aligning liquid crystal molecules in the liquid crystal material, and the alignment films are rubbed in order to control the direction of falling of the liquid crystal molecules.

Therefore, in both of the alignment films the pre-tilt angles are inconsistent due to the rubbing, and hence the angles of falling in the liquid crystal material of the material layer having dielectric anisotropy are inconsistent, when a voltage is applied to the material layer. The retardation of the material layer having the dielectric anisotropy is inconsistent due to the inconsistency in the angles, with the result that an amount of light passing through the liquid crystal display element is inconsistent and hence display irregularity occurs due to the dispersion of the pre-tilt angles on account of the rubbing.

However, as in the present invention, in two substrates sandwiching a liquid crystal material layer, only the alignment film on one of the substrates is rubbed, among the alignment films for aligning the liquid crystal molecules in the liquid crystal material layer. With this, it is possible to restrain a variation in an amount of light passing through the liquid crystal display element, which is caused by the dispersion of the pre-tilt angles resulting from the rubbing. It is therefore possible to obtain a liquid crystal display element which can display high-quality images with no display irregularity.

The reason of the above will be discussed below.

In case where liquid crystal is sandwiched between a substrate with a uniaxial-aligned (e.g. rubbed) alignment film and a substrate with a no-uniaxial-aligned alignment film and a voltage is applied to a liquid crystal layer, the director of the liquid crystal molecules around the boundary face of the uniaxial-aligned substrate falls in the direction in line with the uniaxial-alignment, but the direction of falling of the director of the liquid crystal molecules around the boundary face of the non-uniaxial-aligned substrate is not uniquely determined, because the alignment film contacting the director of the liquid crystal molecules is not uniaxial-aligned.

Therefore, the direction of the director of the liquid crystal molecules is first determined at the boundary face of the substrate having the uniaxial-aligned alignment film. In the area between this boundary face area and the area around the boundary face of the substrate having the non-uniaxial-aligned alignment film, the direction of the director of the liquid crystal molecules is determined by the interaction among the liquid crystal molecules, and lastly the direction of the director of the liquid crystal molecules around the boundary face of the substrate having the non-uniaxial-aligned film is determined.

In this process, the direction of falling is not determined in the liquid crystal molecules around the boundary face of the substrate having the non-uniaxial-aligned alignment film, and hence the direction of falling of the director of the liquid crystal molecules is flexible as compared to a case where uniaxial alignment has been conducted.

Therefore, even if the pre-tilt angles of the liquid crystal molecules are dispersed around the boundary face of the substrate having the uniaxial-aligned alignment film, it is possible to reduce a variation in the azimuth distribution of the director of the liquid crystal molecules around the boundary face of the substrate which opposes the aforesaid substrate and has the non-uniaxial-aligned alignment film, by changing the direction of the azimuth of the director of the liquid crystal molecules. As the variation in the azimuth distribution of the liquid crystal molecules is reduced, the variation in the transmittance of the liquid crystal display element, which is determined by the azimuth distribution of the director of the liquid crystal molecules, is reduced.

The reason of the above will be explained with reference to FIG. 4, FIG. 5, FIG. 7, and FIG. 8.

Each of FIG. 4 and FIG. 5 shows the azimuth distribution of the director of the liquid crystal molecules when the alignment films on the respective substrates sandwiching the liquid crystal layer are uniaxial-aligned.

Each of FIG. 7 and FIG. 8 shows the azimuth distribution of the director of the liquid crystal molecules in case where only one of the alignment films on the respective substrates sandwiching the liquid crystal layer is uniaxial-aligned.

In all of FIG. 4, FIG. 5, FIG. 7, and FIG. 8, the horizontal axis indicates /d which is a value figured out by standardizing the thickness direction (z direction) location of the liquid crystal display element by thickness (d), whereas the vertical axis indicates the azimuth of the liquid crystal director.

FIG. 4 and FIG. 7 show the cases where d=3.5 μm and p=60 μm. In the case of FIG. 4, the azimuth distribution of the director of the liquid crystal molecules varies when the pre-tilt angles of the uniaxial-aligned alignment film are dispersed. In the meanwhile, in the case of FIG. 7, the azimuth distribution of the director of the liquid crystal molecules rarely changes even when the pre-tilt angles of the uniaxial-aligned alignment film are dispersed.

FIG. 5 and FIG. 8 show the cases where d=4.5 μm and p=15 μm. In the case of FIG. 5, the azimuth distribution of the director of the liquid crystal molecules slightly varies when the pre-tilt angles of the uniaxial-aligned alignment film are dispersed. In the meanwhile, in the case of FIG. 8, the azimuth distribution of the director of the liquid crystal molecules rarely changes even when the pre-tilt angles of the uniaxial-aligned alignment film are dispersed.

In this way, when only one of the alignment films on the respective substrates sandwiching the liquid crystal layer is uniaxial-aligned, it is possible to allow for flexibility in the directions of falling of the liquid crystal molecules around the boundary face of the non-uniaxial-aligned alignment film, to some degree. As a result of this, the liquid crystal director of the liquid crystal layer is consecutively and gradually twisted, and hence the alignment of the liquid crystal molecules is smoothly changed in response to a change in the electric field applied to the liquid crystal layer. Since the variation of the light transmission on account of the dispersion in the pre-tilt angles is compensated, the variation in the light transmission is restrained and display characteristics with restrained display irregularity are achieved.

In the graph of FIG. 7, there is a rapid change around the z direction location (/d)=1. In this area, however, the pre-tilt angles of the liquid crystal molecules are substantially 90°. Therefore, even if there is a difference in azimuth, the alignment of the liquid crystal molecules is consecutive and gradual.

Furthermore, since the aligning capability is imparted to only one of the alignment films, it is advantageous in terms of the process in that the manufacturability is good and the cost is low as compared to the case where the aligning capability is imparted to both of the alignment films.

The aforesaid arrangement is also advantageous in that design freedom is high because, when a structure is formed or there is a structural irregularity on one substrate, the aligning capability can be imparted to the alignment film of the other substrate.

Furthermore, in the arrangement above, light transmission of not lower than 0.6 (60%) is attained when $0.25 \leq d/p \leq 0.50$ is satisfied assuming that the thickness of the material layer having the dielectric anisotropy is d and the chiral pitch length of the liquid crystal material is p and $1000 \times d/p \leq \Delta n \times d$ is satisfied assuming that the refractive index anisotropy of the liquid crystal material is Δn. It is therefore possible to achieve good display quality of the liquid crystal display element.

Therefore, in the arrangement above, even if the pre-tilt angles of the alignment film are dispersed, a variation in an amount of transmitted light due to the dispersion in the pre-tilt angles of the alignment film is restrained and hence display characteristics with restrained display irregularity are achieved, and hence it is possible to realize a liquid crystal display element in a twisted vertical alignment mode, which excels in light transmission.

BRIEF DESCRIPTION OF DRAWINGS

FIG. 9 is a plan view of an active matrix substrate, which shows the direction of rubbing.

FIG. 10(*b*) shows how transmittance of a pixel is different when the direction of rubbing is different.

FIG. 10(*c*) shows how transmittance of a pixel is different when the direction of rubbing is different.

REFERENCE NUMERALS

31 LIQUID CRYSTAL DISPLAY ELEMENT
32 FIRST SUBSTRATE (SUBSTRATE)
33 SECOND SUBSTRATE (SUBSTRATE)
4 LIQUID CRYSTAL LAYER (MATERIAL LAYER WITH DIELECTRIC ANISOTROPY)
34 ALIGNMENT FILM (VERTICAL ALIGNMENT FILM)
35 ALIGNMENT FILM (VERTICAL ALIGNMENT FILM)
36 SPACER (LAYER THICKNESS CONTROL MEMBER)
50 SOURCE LINE
51 GATE LINE

BEST MODE FOR CARRYING OUT THE INVENTION

Embodiment 1

Figure 1:
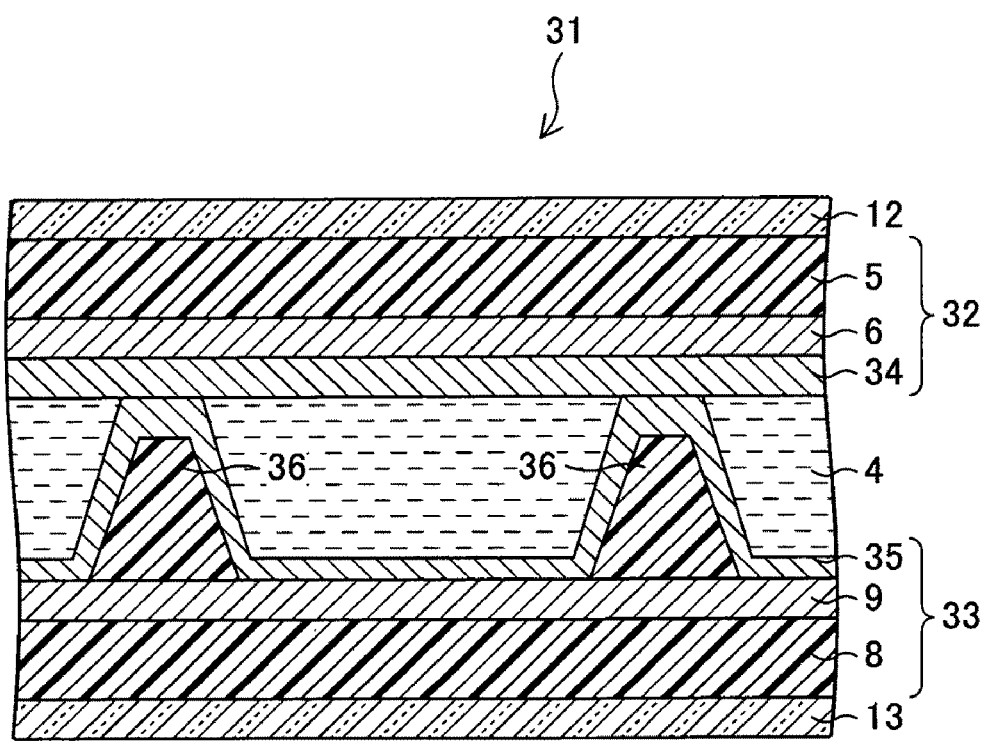
FIG. 1 relates to an embodiment of the present invention and is a cross section which outlines a liquid crystal display element.
Figure 2:
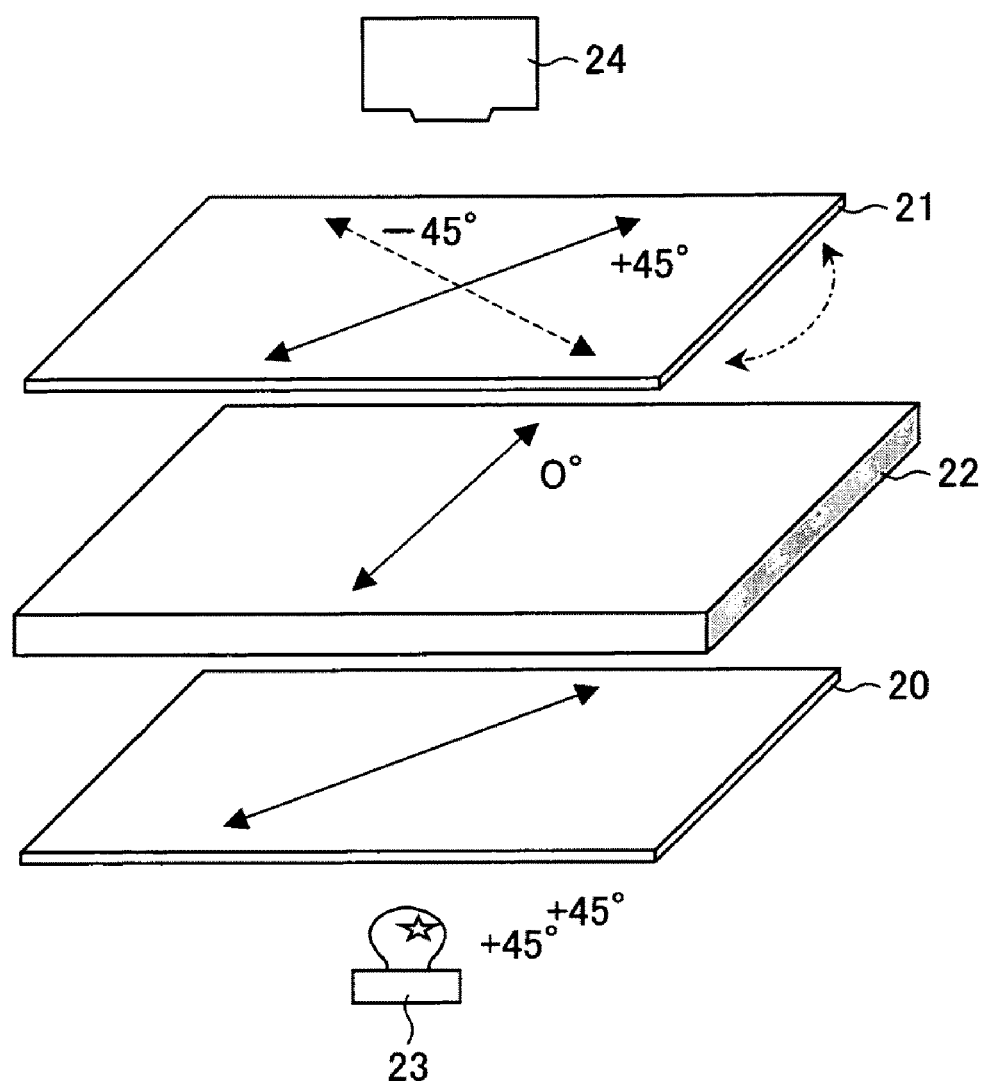
FIG. 2 relates to the embodiment of the present invention and shows a measurement by rotating analyzer.
Figure 3:
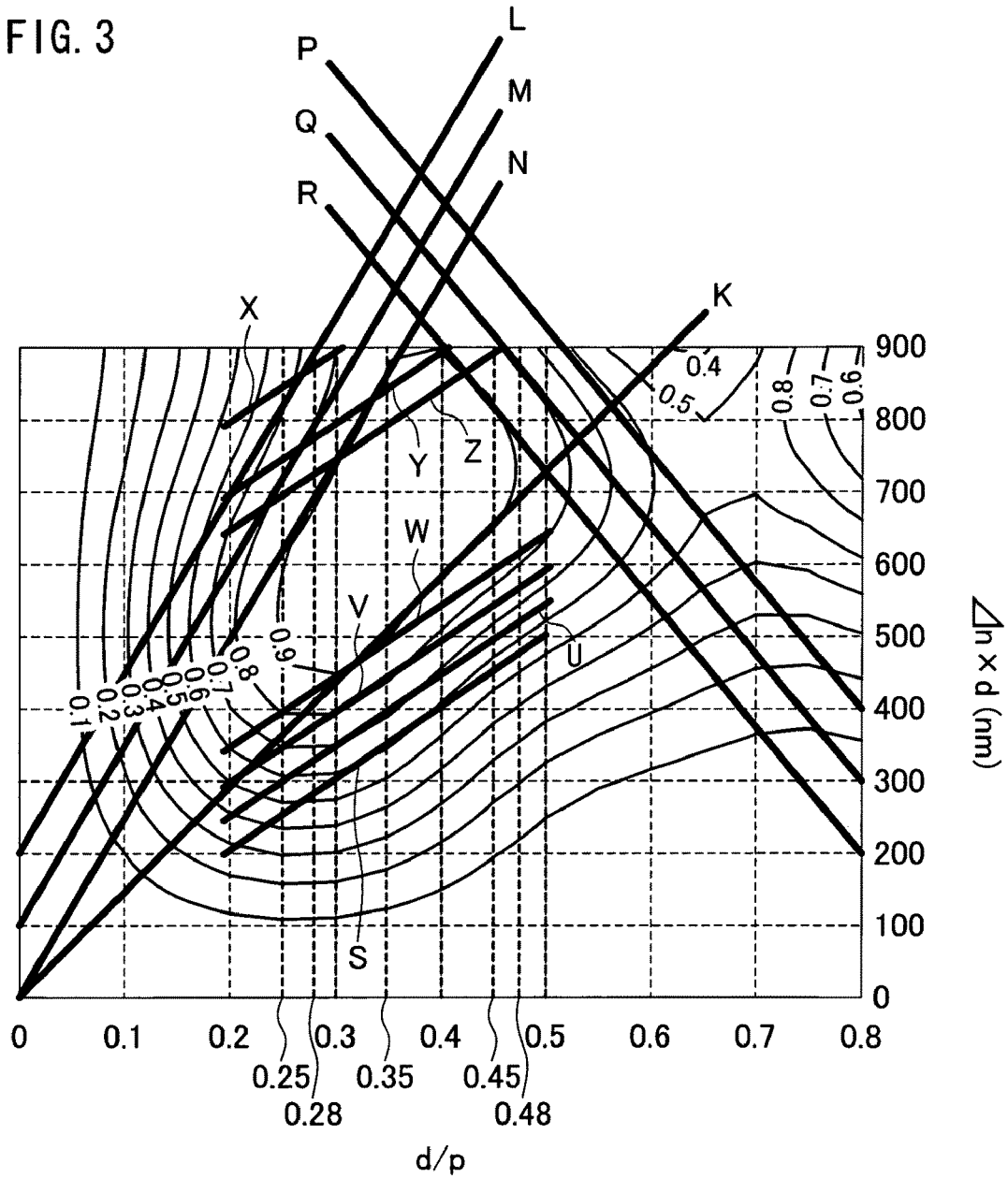
FIG. 3 relates to the embodiment of the present invention and is a graph showing the relationship between d/p in a liquid crystal display element in which only one of alignment films has been rubbed and the light transmission, and the relationship between Δn×d and the light transmission.
Figure 4:
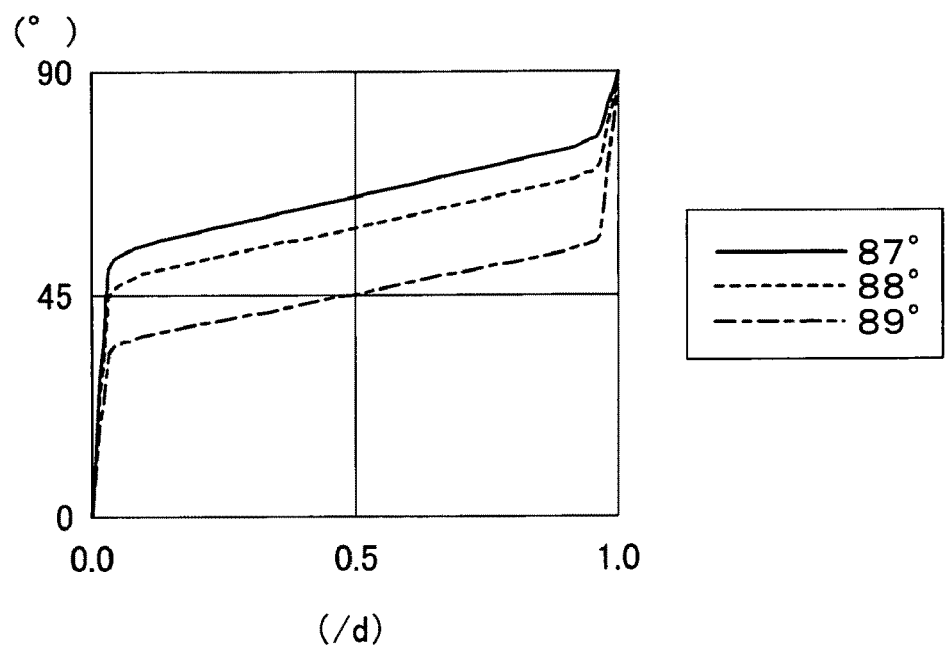
FIG. 4 is a graph showing the relationship between /d and the azimuth of the director in liquid crystal molecules of a conventional liquid crystal display element.
Figure 5:
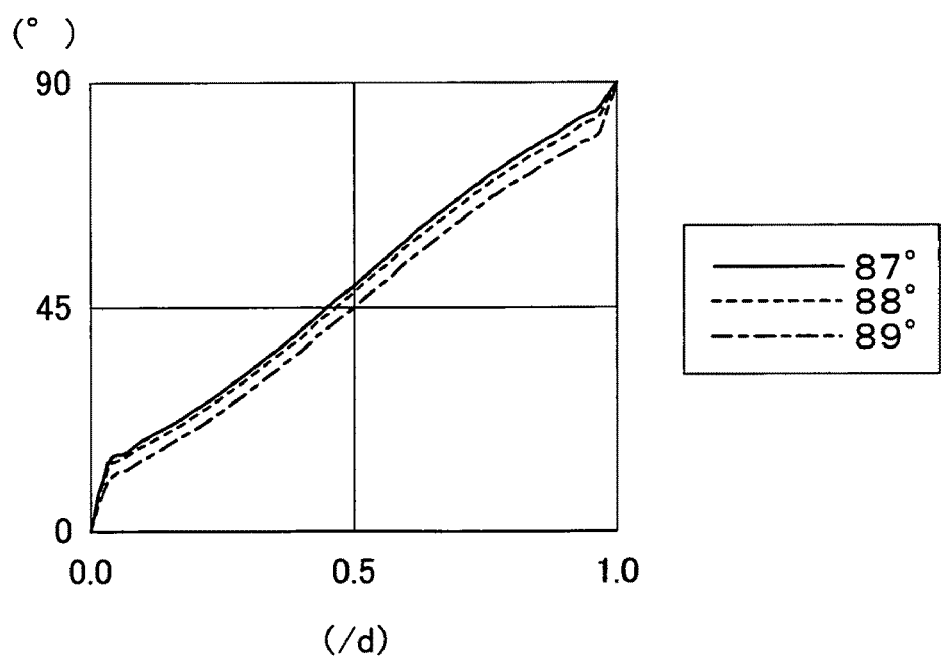
FIG. 5 is a graph showing the relationship between /d and the azimuth of the director in liquid crystal molecules of a conventional liquid crystal display element.
Figure 6:
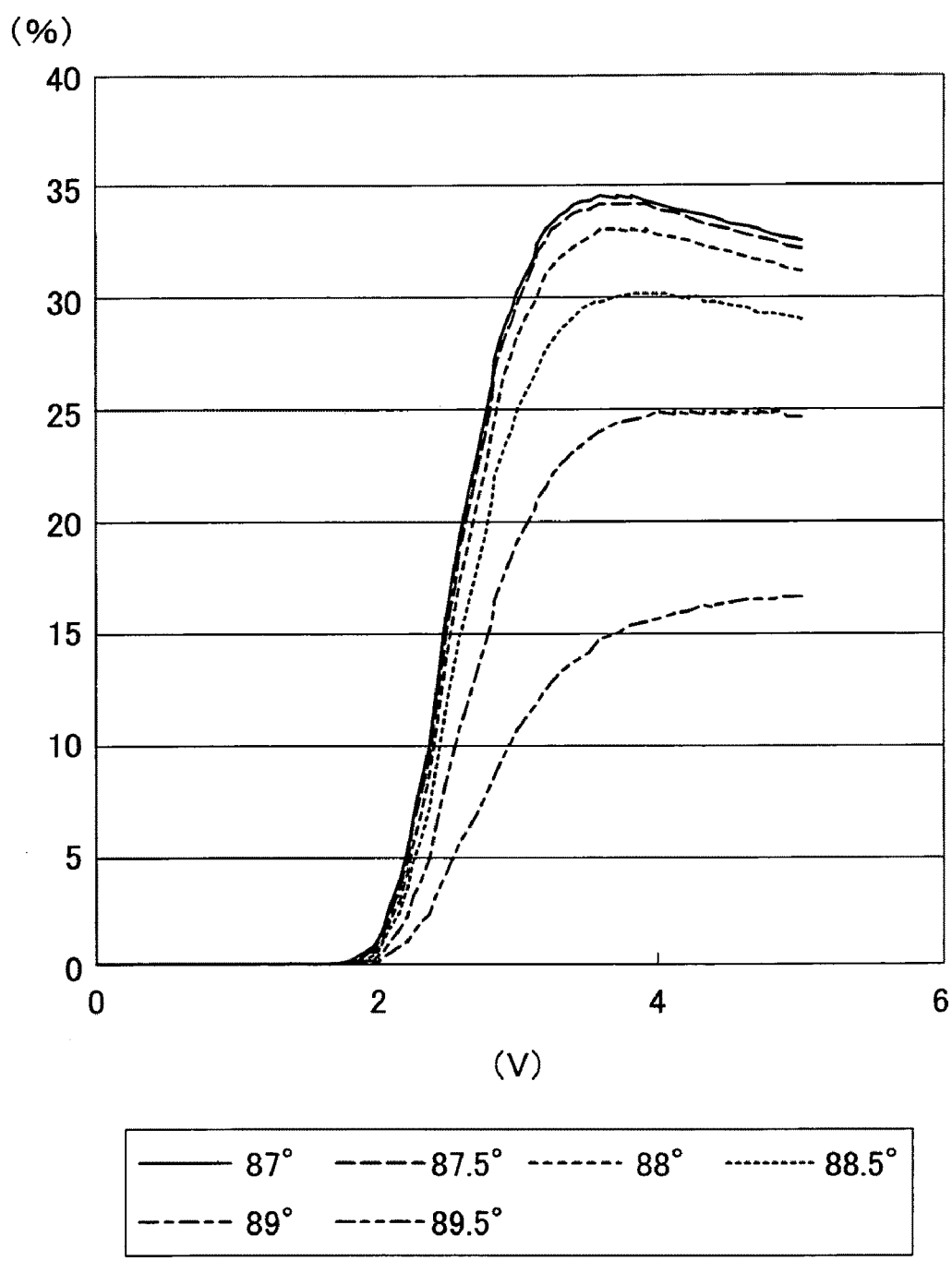
FIG. 6 is a graph showing the relationship between voltage and light transmission in a conventional liquid crystal display element.
Figure 7:
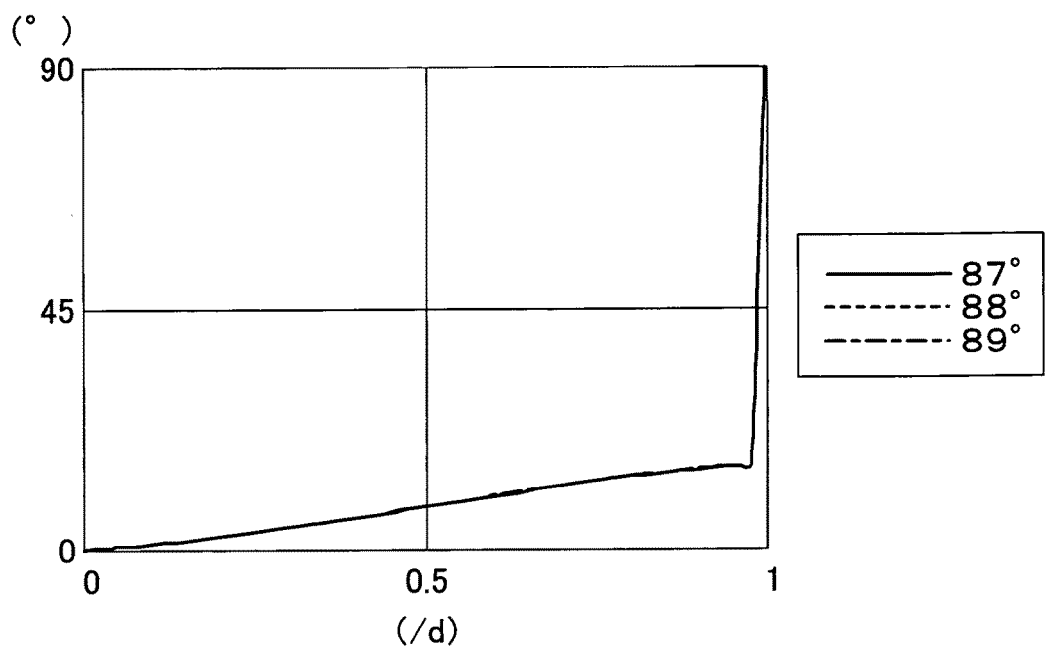
FIG. 7 is a graph showing the relationship between /d and the azimuth of the director in liquid crystal molecules of a liquid crystal display element of the present invention.
Figure 8:
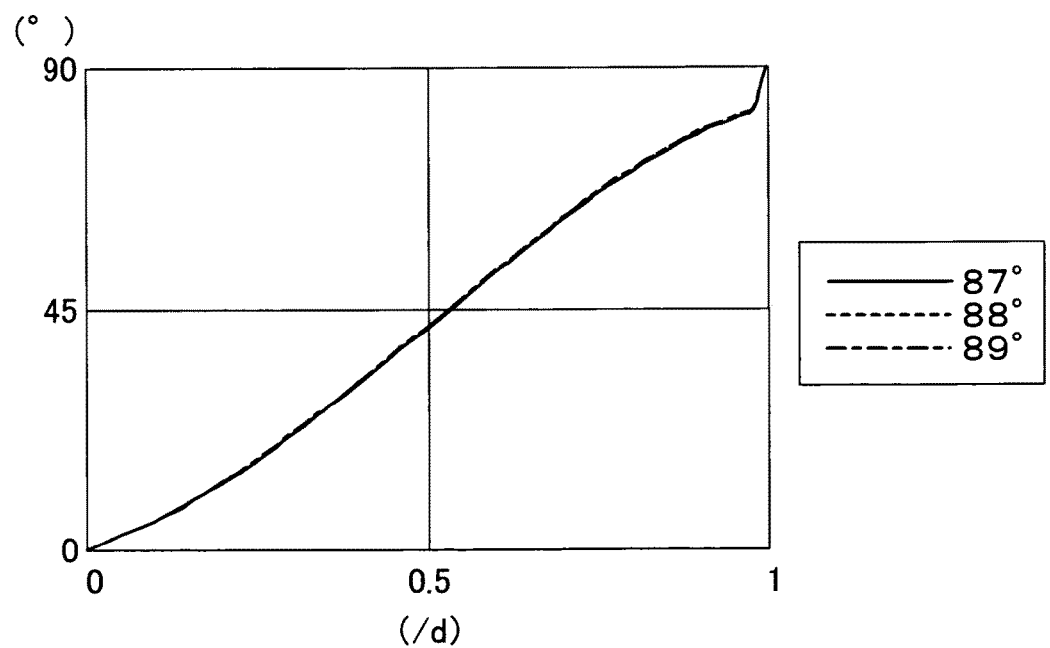
FIG. 8 is a graph showing the relationship between /d and the azimuth of the director in liquid crystal molecules of a liquid crystal display element of the present invention.

The following will explain an embodiment of the present invention with reference to FIG. 1, FIG. 2, and FIG. 3.

(Liquid Crystal Display Element)

FIG. 1 is a cross section which outlines a liquid crystal display element 31 of the present embodiment. As shown in FIG. 1, the liquid crystal display element (liquid crystal display cell) 31 of the present embodiment is provided with a pair of light-transmitting substrates (first substrate 32 and second substrate 33) facing each other. The liquid crystal display element 31 has a cell structure such that a liquid crystal layer (substance layer having dielectric anisotropy) 4 is sandwiched between the pair of substrates (first substrate 32 and second substrate 33).

The first substrate 32 includes a planar light-transmitting substrate 5 made of a light-transmitting material such as grass, a transparent electrode 6, and an alignment film 34. Similarly, the second substrate 33 includes a planar light-transmitting substrate 8 made of a light-transmitting material such as grass, a transparent electrode 9, and an alignment film 35. The first substrate 32 and the second substrate 33 are jointed with a spacer (layer thickness control member) 36 interposed therebetween, so as to form a single cell.

The transparent electrode 6 is provided on the surface of the light-transmitting substrate 5, which surface opposes the other light-transmitting substrate 8. The transparent electrode 9 is provided on the surface of the light-transmitting substrate 8, which surface opposes the other light-transmitting substrate 5. In short, the transparent electrode 6 and the transparent electrode 9 are disposed to oppose each other.

The transparent electrode 6 is formed on the light-transmitting substrate 5 in such a manner that a conductive film such as ITO (indium tin oxide) is formed by means of sputtering or the like, and patterning into an appropriate shape is carried out thereto by photolithography. Similarly, the transparent electrode 9 is formed by performing patterning to have an appropriated shape on the light-transmitting substrate 8.

The transparent electrode 6 and the transparent electrode 9 are provided so that pixels are formed at portions where the patterns these electrodes overlap one another. In response to an electric potential supplied from the outside, an electric field is formed on the pixel part so that the liquid crystal molecules at the pixel part are switched. Plural pixels each of which is arranged as above constitute a display area of the liquid crystal display element 31.

The alignment film 34 is provided to control the alignment of the liquid crystal molecules (liquid crystal substance) so that the longitudinal axis direction of the liquid crystal molecules is substantially orthogonal to the surface of the first substrate 32 (i.e. in the direction closer to the direction orthogonal to the substrate than the direction in parallel to the substrate) when no electric field is applied to the space between the first substrate 32 and the second substrate 33.

The alignment film 35 controls the alignment of the liquid crystal molecules so that the longitudinal axis direction of the liquid crystal molecules is orthogonal to the surface of the second substrate 33 when no electric field is applied to the space between the first substrate 32 and the second substrate 33.

The alignment film 34 is formed to cover the entirety of a part of the surface of the first substrate 32, on which part the transparent electrode 6 is formed. In other words, the alignment film 34 covers the entirety of the transparent electrode 6 formed surface. The alignment film 35 is formed to cover the entirety of a part of the surface of the second substrate 33, on which part the transparent electrode 9 is formed. In other words, the alignment film 35 covers the entirety of the transparent electrode 9 formed surface. In short, the alignment film 34 and the alignment film 35 are formed so as to oppose each other.

The alignment film 34 has been uniaxial-aligned (e.g. has been rubbed) in advance, for the purpose of determining the direction to which the liquid crystal molecules tilt in response to the application of an electric field.

The alignment film 34 and the alignment film 35 may be organic films or inorganic films. Any types of films may be used as the alignment films as long as the order of the alignment of the liquid crystal molecules is improved and the liquid crystal molecules are aligned in a desired direction. The alignment film 34 and the alignment film 35 are preferably organic thin films because good alignment is achievable. Among organic thin films, polyimide is particularly preferable because this material excels in stability and reliability and makes it possible to achieve extremely good alignment. The alignment film 34 and the alignment film 35 may be commercially-available vertical alignment films such as RN-783 (product name) of Nissan Chemical Industries, Ltd. and JALS-203 (product name) of JSR Corporation.

The spacer 36 is, for example, a resin column spacer (so-called photo spacer; PS) formed on a color filter. This spacer 36 is formed in such a way that a photosensitive resin is provided on a color filter and photolithography is conducted thereto. The alignment film 35 is applied onto this spacer 36 (resin column spacer). Therefore, when the alignment film 35 is rubbed, rubbing lines are wide and hence irregularity in image display is conspicuous. For this reason, in the present embodiment, only the alignment film 34 is rubbed.

In other words, in the present invention, rubbing is carried out for only the alignment film 34 which is on the first substrate 32 where a cell thickness control member such as the spacer 36, by which the thickness of the liquid crystal layer 4 is controlled, is not provided. In this way, the alignment film which has been rubbed is an alignment film on a substrate which is not provided with a spacer. For example, such an alignment film may be provided on a substrate where a TFT is provided, or may be provided on a substrate where a color filter is provided.

On the outer sides of the first substrate 32 and the second substrate 33, i.e. on the opposing surfaces of the substrates 32 and 33, a polarizing plate 12 and a polarizing plate 13 are provided, respectively. The polarizing plate 12 is disposed so that the polarization axis thereof is in parallel to the direction (rubbing direction) of the rubbing of the alignment film 34. The polarizing plate 13 is disposed so that the polarization axis thereof is substantially orthogonal to the rubbing direction of the alignment film 34. In other words, the polarizing plate 12 and the polarizing plate 13 are disposed so that the polarization axes thereof are substantially orthogonal to each other.

The liquid crystal layer 4 includes a liquid crystal material (liquid crystal substance) and a chiral material. This liquid crystal material includes a lot of liquid crystal molecules, and has negative dielectric anisotropy $\Delta\in$ and a predetermined chiral pitch length. The liquid crystal material of the present invention is not limited to any particular type, and hence a typical liquid crystal material can be used. As in the case of the present embodiment, as a liquid crystal material with the negative dielectric anisotropy $\Delta\in$, it is possible to use MJ941296 (product name) of Merck Ltd. or MLC6690 (product name) of Merck Ltd.

The chiral material is added to impart a predetermined chiral pitch length to the liquid crystal material. While not limited to any particular type, the chiral material of the present invention is suitably chosen in consideration of the type of the liquid crystal material and the degree of the chiral pitch length. For example, the chiral material is S-811 (product name) of Merck Ltd. An amount of the added chiral material is suitably determined in consideration of the liquid crystal material and the degree of the chiral pitch length. Details of this will be given later.

Because of the above-described arrangement, the liquid crystal display element 31 of the present embodiment realizes a so-called twisted vertical alignment (TVA) mode in which the liquid crystal molecules falls while being twisted, when an electric field is applied to the liquid crystal layer 4 via the transparent electrode 6 and the transparent electrode 9.

(Pre-Tilt Angle)

The liquid crystal display element 31 of the present embodiment includes the alignment film 34 which has been rubbed as explained above. Therefore, in this liquid crystal display element 31, the liquid crystal molecules are tilted to form a predetermined angle with the surface of the substrate, when no electric field is applied. In the present embodiment, only the alignment film 34 has been rubbed. Therefore the liquid crystal molecules are tilted only with respect to the surface of the first substrate 32. The angle formed by the longitudinal axis of the liquid crystal molecules and the surface of the first substrate 32 in this case is pre-tilt angle. More specifically, the pre-tilt angle is an initial angle of the director of the liquid crystal molecules with respect to the first substrate 32, when no voltage is applied thereto.

The pre-tilt angle is ideally uniform across the surface of the first substrate 32. In reality, however, the liquid crystal molecules with slightly different pre-tilt angles are distributed on the entirety of the surface. In other words, the pre-tilt angles are dispersed on the entirety of the surface of the substrate. This dispersion of the pre-tilt angles indicates that the initial angles (pre-tilt angles) of the director of the liquid crystal molecules are different in the molecule level or near-molecule level (e.g. in an area of about 10 μm in radius).

In the present embodiment, the range of the dispersion of the pre-tilt angles is about α±3°, assuming that the median of the pre-tilt angles of the liquid crystal material in the display area is α. For example, when the alignment film 34 is a vertical alignment film, the range is about 87°±3°. In this case, the pre-tilt angles of the liquid crystal molecules when no voltage is applied fall within the range of 84° to 90°. In case where the alignment film 35 is also a vertical alignment film, the liquid crystal molecules are vertically aligned with respect to the second substrate 33, i.e. forms an angle of 90° with the second substrate 33.

A pre-tilt angle can be measured by publicly-known methods. For example, it is possible to perform the measurement by using crystal rotation. The outline of a specific measurement principle is as follows. First, a test panel is disposed between two polarizing plates. A laser beam is applied thereto while the test panel is rotated. As a result, it is possible to measure an amount of light which passes through an analyzer while the incident angle of the light is varied. A pre-tilt angle is measured by performing the curve fitting of obtained rotative angle and transmittance of the test panel by using 2×2 matrix. The measurement of pre-tilt angle may be performed by other methods.

(Amount of Chiral Material to be Added)

The chiral material forms a twisted structure with neighboring molecules in the liquid crystal material. As a result, the energy of interaction between the molecules in the liquid crystal material is decreased and hence the liquid crystal material becomes to spontaneously have a twisted structure and to be steady in this state. It is therefore possible to change the chiral pitch length of the liquid crystal material by adjusting an amount of the chiral material to be added.

In the present embodiment, an amount of the chiral material to be added is adjusted so that the chiral pitch length falls within a predetermined range. Specifically, the range of the chiral pitch length is arranged so that d/p satisfies $0.25 \leq d/p \leq 0.50$, preferably $0.25 \leq d/p \leq 0.48$, and more preferably $0.25 \leq d/p \leq 0.45$, assuming that the thickness of the liquid crystal layer 4 (thickness of a material layer having dielectric anisotropy; cell thickness) is d and the chiral pitch length of the liquid crystal material constituting the liquid crystal layer 4 is p. In other words, in the liquid crystal display element 31 of the present embodiment, an amount of the chiral material to be added is adjusted so that the chiral pitch length of the liquid crystal material falls within the aforesaid range.

The aforesaid d/p further preferably falls within the range of $0.28 \leq d/p \leq 0.45$, still more preferably falls within the range of $0.28 \leq d/p \leq 0.40$, even more preferably falls within the range of $0.30 \leq d/p \leq 0.40$, and most preferably falls within the range of $0.30 \leq d/p \leq 0.35$. The reason of this will be given later.

The measurement of the chiral pitch length of the liquid crystal material can be performed by a publicly-known technique. For example, it can be measured as follows: the chiral pitch length is measured by using helical twisting power (HTp) which is represented by HTp=1/pc assuming that the chiral pitch length is p and an amount of the chiral material to be added is c. While not limited to this, any methods can be used as long as the chiral pitch length is properly measured.

(Retardation)

When d/p falls within the aforesaid range, while a variation in the light transmission with respect to a variation of d/p is restrained, an amount of transmitted light may be decreased depending on the retardation. Such decrease in transmitted light occurs when the retardation is relatively low. Therefore, in such a case, the retardation is increased by, for example, changing the thickness of the liquid crystal layer 4 so that an amount of transmitted light is increased.

The retardation is represented by $\Delta n \times d$ assuming that the thickness of the liquid crystal layer 4 is d and the refractive index anisotropy is $\Delta n$. When d/p falls within the range of $0.25 \leq d/p \leq 0.50$ as in the case of the liquid crystal display element 31 of the present embodiment, the retardation $\Delta n \times d$ preferably falls within the range of $1000 \times d/p \leq \Delta n \times d$.

This makes it possible to restrain the decrease in an amount of transmitted light, which occurs when the chiral pitch length of the liquid crystal material is adjusted as above.

To further increase an amount of transmitted light, the aforesaid $\Delta n \times d$ further preferably falls within the range of $1000 \times d/p + 100 \leq \Delta n \times d$.

The retardation can be measured by a publicly-known technology. For example, it can be measured by a rotating analyzer method as discussed below. FIG. 2 shows measurement by using rotating analyzer. As shown in this figure, a measured object 22 is provided between a polarizer 20 and an analyzer 21, and light is applied thereto from a light source 23. The analyzer 21 is rotated as indicated by the dashed line in FIG. 2, and the retardation is measured based on the light intensity detected by a light receiving section 24. In this case, the retardation (Re) is represented by $Re=(\lambda/\pi)\tan^{-1}(Tc/Tp)^{1/2}$ assuming that the retardation is Re, the wavelength of light is $\lambda$, parallel transmittance is Tp, and orthogonal transmittance is Tc.

The thickness d of the liquid crystal layer 4 can be figured out based on the retardation measured as above. The retardation and the thickness of the liquid crystal layer 4 may be measured by other methods.

(Basis of an Amount of Chiral Material to be Added (Chiral Pitch Length) and Range of Retardation)

Now, referring to FIG. 3, the following will explain why d/p and $\Delta n \times d$ preferably fall within the aforesaid ranges in Embodiment 1. FIG. 3 is a graph showing the light transmission of the liquid crystal display element 31 in which only one alignment film 34 has been rubbed. In the graph, the light transmission is represented in contour, and the horizontal line indicates d/p whereas the vertical line indicates $\Delta n \times d(nm)$. The light transmission is maximum at 1 (100%) and minimum at 0 (0%).

Typically, the light transmission is preferably not less than 0.6 (60%) in order to achieve good display quality of the liquid crystal display element. When d/p falls within the aforesaid range ($0.25 \leq d/p \leq 0.50$), the tangent line of each contour line is steep in case where d/p is high, as compared to a case where d/p is low. Therefore, the range of variation in the light transmission with respect to the variation of $\Delta n \times d$ is wide in this case, and the range of $\Delta n \times d$ with which light transmission of not lower than 0.6, preferably not lower than 0.7, and more preferably not lower than 0.8 is narrow.

Therefore, as discussed above, d/p preferably falls within the range of, as shown in FIG. 3, $0.25 \leq d/p \leq 0.48$, more preferably $0.28 \leq d/p \leq 0.45$, and even more preferably $0.28 \leq d/p \leq 0.40$.

As shown in FIG. 3, when d/p falls within the range of $0.30 \leq d/p \leq 0.40$, the range of $\Delta n \times d$ with which the light transmission is not lower than 0.9 is significantly wide as compared to the case where d/p falls within the range of $0.25 \leq d/p < 0.30$ or $0.40 < d/p \leq 0.50$.

Therefore, when d/p falls within the range of $0.30 \leq d/p \leq 0.40$, a variation (change) in the light transmission in accordance with the variation in $\Delta n \times d$ is effectively restrained.

When d/p falls within the range of $0.30 \leq d/p \leq 0.35$, the variation in the light transmission of the liquid crystal display element 31 is further restrained, and the required thickness d of the liquid crystal layer 4 for achieving the same light transmission when the same liquid crystal material is used is reduced. Therefore, it is further preferable to arrange d/p to fall within the range of not lower than 0.30 and not higher than 0.35.

Therefore, adding a chiral material so as to arrange d/p to fall within the aforesaid range, it is possible to consecutively and gradually twist the director of the liquid crystal molecules, when an electric field is applied. This makes it possible to smoothly change the alignment of the liquid crystal molecules in response to a change in electric field. In this way, a difference in the retardation, which occurs due to the irregularity in pre-tilt angles, is compensated by the smooth change of the alignment of the liquid crystal molecules, and irregularity in the retardation is balanced out within the liquid crystal molecules.

Now, the range of $\Delta n \times d$ is explained. As discussed above, the light transmission is preferably not lower than 0.6 (60%) in order to obtain good display quality of the liquid crystal display element. The range of the retardation is therefore arranged to arrange the light transmission to fall within the aforesaid range.

As shown in FIG. 3, in case where $0.25 \leq d/p \leq 0.50$, the retardation is arranged to satisfy $1000 \times d/p \leq \Delta n \times d$ (above the line above the line S in FIG. 3, which is represented by $1000 \times d/p = \Delta n \times d$) in order to cause the light transmission of the liquid crystal display element 31 to be not lower than 0.6. Proper brightness is achieved when the retardation falls within the aforesaid range. Therefore, in this liquid crystal display element 31, display irregularity (due to rubbing lines) on account of variation in the pre-tilt angles is prevented and proper brightness is obtained, and hence good display quality is achieved.

When the light transmission is in more preferable ranges, i.e. not lower than 0.7 (70%), further preferably not lower than 0.8 (80%), and even more preferably not lower than 0.9 (90%), brighter image display is feasible and hence the display quality is further improved.

As shown in FIG. 3, in case where $0.25 \leq d/p \leq 0.50$, the retardation with which the light transmission of the liquid crystal display element 31 is not lower than 0.7 is $1000 \times d/p + 50 \leq \Delta n \times d$ (i.e. above the line U in FIG. 3, which is represented by $1000 \times d/p + 50 = \Delta n \times d$). The retardation with which the light transmission is not lower than 0.8 is $1000 \times d/p + 100 \leq \Delta n \times d$ (i.e. above the line V in FIG. 3, which is represented by $1000 \times d/p + 100 = \Delta n \times d$). The retardation with which the light transmission is not lower than 0.9 is $1000 \times d/p + 150 \leq \Delta n \times d$ (i.e. above the lien W in FIG. 3, which is represented by $1000 \times d/p + 150 = \Delta n \times d$). In these cases, bright image display is achieved and hence good image display quality is obtained.

As shown in FIG. 3, when $0.25 \leq d/p \leq 0.50$ (more preferably the lower limit of d/p is 0.28, still more preferably 0.3, and the upper limit is more preferably 0.45), the retardation of the liquid crystal display element 31 is $1500 \times d/p \leq \Delta n \times d$ (i.e. above the line K in FIG. 3, which is represented by $1500 \times d/p = \Delta n \times d$), $\Delta n \times d \leq 2500 \times d/p$ (i.e. below the line R in FIG. 3, which is represented by $\Delta n \times d = 2500 \times d/p$), and $\Delta n \times d \leq -1750 \times d/p + 1600$ (i.e. below the line N in FIG. 3, which is represented by $\Delta n \times d = -1750 \times d/p + 1600$). Preferably, in addition to the conditions above, $\Delta n \times d \leq 900$ nm. With this, it is possible to ensure the light transmission of not lower than 0.9.

The liquid crystal display element 31 has high transmittance in short wavelengths. As shown in FIG. 3, when $0.25 \leq d/p \leq 0.50$, the light transmission of the liquid crystal display element 31 when the retardation is high is sufficient for achieving good image display quality. The upper limit of the retardation of the liquid crystal display element 31 is therefore not particularly limited. However, as shown in FIG. 3, it is preferable to set not only the minimum ($1000 \times d/p \leq \Delta n \times d$) but also the maximum of the retardation, in order to restrain the decrease in an amount of transmitted light due to the increase in the retardation.

More specifically, for example, as shown in FIG. 3, in case where $0.25 \leq d/p \leq 0.50$, the retardation of the liquid crystal display element 31 is set so as to be $\Delta n \times d \leq 2500 \times d/p + 150$ (i.e. below the line P in FIG. 3, which is represented by $\Delta n \times d = 2500 \times d/p + 150$) and $\Delta n \times d \leq -1750 \times d/p + 1750$ (i.e. below the line L in FIG. 3, which is represented by $\Delta n \times d = -1750 \times d/p + 1750$). This makes it possible to achieve the light transmission of not lower than 0.7.

In case where $0.25 \leq d/p \leq 0.50$, the retardation is set so as to be $\Delta n \times d \leq 2500 \times d/p + 100$ (i.e. below the line Q in FIG. 3, which is represented by $\Delta n \times d = 2500 \times d/p + 100$) and $\Delta n \times d \leq -1750 \times d/p + 1700$ (i.e. below the line M in FIG. 3, which is represented by $\Delta n \times d = -1750 \times d/p + 1700$). This makes it possible to achieve the light transmission of not lower than 0.8.

In case where $0.25 \leq d/p \leq 0.50$, the retardation is set so as to be $\Delta n \times d \leq 2500 \times d/p$ (i.e. below the line R in FIG. 3, which is represented by $\Delta n \times d = 2500 \times d/p$) and $\Delta n \times d \leq -1750 \times d/p + 1600$ (i.e. below the line N in FIG. 3, which is represented by $\Delta n \times d = -1750 \times d/p + 1600$). This makes it possible to achieve the light transmission of not lower than 0.9.

In this manner, the upper limit of the retardation of the liquid crystal display element 31 is set so that the decrease in the light transmission due to excessively high retardation is surely prevented, and hence proper brightness is achieved. The arrangement above further restrain the decrease in the display quality and hence makes it possible to obtain good display quality.

As discussed above, when $0.25 \leq d/p \leq 0.50$, the light transmission of the liquid crystal display element 31 when the retardation is high is sufficient to achieve good image display quality. However, when the retardation of the liquid crystal display element 31 exceeds 900 nm, color problems (inappropriate color and contrast) may occur.

The retardation of the liquid crystal display element 31 is preferably not higher than 900 nm. It is possible to eliminate the color problems as well as obtain the aforesaid light transmission by setting the retardation of the liquid crystal display element 31 to be not higher than 900 nm, in addition to the above-described conditions, and hence good display quality of the liquid crystal display element 31 is achieved.

More simply, as shown in FIG. 3, in case where $0.25 \leq d/p \leq 0.50$, it is possible to ensure the light transmission of not lower than 0.6 and eliminate the color problems in the liquid crystal display element 31, by only setting the upper limit of the retardation to be 900 nm. That is to say, in case where $0.25 \leq d/p \leq 0.50$, it is possible to obtain the liquid crystal display element 31 having the aforesaid advantages, by setting the retardation to fall within the range of $1000 \times d/p \leq \Delta n \times d \leq 900$ (i.e. not higher than 900 nm and above the line S in FIG. 3, at which the light transmission of not lower than 0.6 is achieved).

When the upper limit of the retardation is 900 nm, in the range of $0.25 \leq d/p \leq 0.50$, the light transmission of not lower than 0.7 is achieved by setting the lower limit of d/p at 0.28, and the light transmission of not lower than 0.8 is achieved by setting the lower limit of d/p at 0.30.

Also, when the upper limit of the retardation is 900 nm, in the range of $0.25 \leq d/p \leq 0.50$, the light transmission of not lower than 0.8 is achieved by setting the upper limit of d/p at 0.45, and the light transmission of not lower than 0.9 is achieved by setting the upper limit of d/p at 0.40.

In this way, as shown in FIG. 3, the gradient of the contour indicating the light transmission changes when d/p is 0.40, more preferably 0.35.

Therefore, in the range of $0.25 \leq d/p \leq 0.50$, when d/p is not higher than 0.40, more preferably not higher than 0.35, as shown in FIG. 3, it is possible to obtain the light transmission of not lower than 0.7 by setting the retardation of the liquid crystal display element 31 at $\Delta n \times d \leq 2500 \times d/p + 150$ (i.e. below the line P in FIG. 3) and $\Delta n \times d \leq 900$(nm), it is possible to obtain the light transmission of not lower than 0.8 by setting the retardation at $\Delta n \times d \leq 2500 \times d/p + 100$ (i.e. below the line Q in FIG. 3) and $\Delta n \times d \leq 900$(nm), and it is possible to obtain the light transmission of not lower than 0.9 by setting the retardation at $\Delta n \times d \leq 2500 \times d/p$ (i.e. below the line R in FIG. 3) and $\Delta n \times d \leq 900$(nm).

On the other hand, in the range of $0.25 \leq d/p \leq 0.50$, when d/p is not lower than 0.40, as shown in FIG. 3, it is possible to obtain the light transmission of not lower than 0.8 by setting the retardation of the liquid crystal display element 31 at $\Delta n \times d \leq -1750 \times d/p + 1700$ (i.e. below the line M in FIG. 3) and $\Delta n \times d \leq 900$(nm), and it is possible to obtain the light transmission of not lower than 0.9 by setting the retardation at $\Delta n \times d \leq -1750 \times d/p + 1600$ (i.e. below the line N in FIG. 3) and $\Delta n \times d \leq 900$(nm).

To design the liquid crystal display element 31, the retardation with which the light transmission of not lower than 0.6 is obtained can be easily calculated by, for example, using the equation ($\Delta n \times d = 1000 \times d/p + \alpha$) which is used for specifying the lower limit of the retardation. This makes it possible to calculate the upper limit of the retardation by simply adding a predetermined constant $\alpha$ to a calculated lower limit of the retardation.

In this case, for example, as shown in FIG. 3, in the range of $0.25 \leq d/p \leq 0.50$, the light transmission of not lower than 0.6 is achieved in the liquid crystal display element 31 by setting the retardation at $\Delta n \times d \leq 1000 \times d/p + 600$ (i.e. below the line X in FIG. 3, which is represented by $\Delta n \times d = 1000 \times d/p + 600$).

Also, as shown in FIG. 3, in case where $0.25 \leq d/p \leq 0.50$, it is possible to obtain the light transmission of not lower than 0.7 by setting the retardation at $\Delta n \times d \leq 1000 \times d/p + 500$ (i.e. below the line Y in FIG. 3, which is represented by $\Delta n \times d = 1000 \times d/p + 500$), and it is possible to obtain the light transmission of not lower than 0.8 by setting the retardation at $\Delta n \times d \leq 1000 \times d/p + 450$ (i.e. below the line Z in FIG. 3, which is represented by $\Delta n \times d = 1000 \times d/p + 450$).

Therefore, in case where $0.25 \leq d/p \leq 0.50$, it is possible to obtain the light transmission of not lower than 0.6 by setting the retardation at $1000 \times d/p \leq \Delta n \times d \leq 1000 \times d/p + 600$ (i.e. above the line S and below the line X in FIG. 3), it is possible to obtain the light transmission of not lower than 0.7 by setting the retardation at $1000 \times d/p + 50 \leq \Delta n \times d \leq 1000 \times d/p + 500$ (i.e. above the line U and below the line Y in FIG. 3), and it is possible to obtain the light transmission of not lower than 0.8 by setting the retardation at $1000 \times d/p + 100 \leq \Delta n \times d \leq 1000 \times d/p + 450$ (i.e. above the line V and below the line Z in FIG. 3).

Also, as shown in FIG. 3, in case where $0.28 \leq d/p \leq 0.45$, it is possible to obtain the light transmission of not lower than 0.7 by setting the retardation at $\Delta n \times d \leq 1000 \times d/p + 600$ (i.e. below the line X in FIG. 3), it is possible to obtain the light transmission of not lower than 0.8 by setting the retardation at $\Delta n \times d \leq 1000 \times d/p + 500$ (i.e. below the line Y in FIG. 3), and it is possible to obtain the light transmission of not lower than 0.9 by setting the retardation at $\Delta n \times d \leq 1000 \times d/p+450$ (i.e. below the line Z in FIG. 3).

Therefore, in case where $0.28 \leq d/p \leq 0.45$, for example, it is possible to obtain the light transmission of not lower than 0.7 by setting the retardation at $1000 \times d/p+50 \leq \Delta n \times d \leq 1000 \times d/p+600$ (i.e. above the line U and below the line X in FIG. 3), it is possible to obtain the light transmission of not lower than 0.8 by setting the retardation at $1000 \times d/p+100 \leq \Delta n \times d \leq 1000 \times d/p+500$ (i.e. above the line V and below the line Y in FIG. 3), and it is possible to obtain the light transmission of not lower than 0.9 by setting the retardation at $1000 \times d/p+150 \leq \Delta n \times d \leq 1000 \times d/p+450$ (i.e. above the line W and below the line Z in FIG. 3).

Also, as shown in FIG. 3, in case where $0.28 \leq d/p \leq 0.40$, it is possible to surely obtain the light transmission of not lower than 0.7 by setting the retardation at $\Delta n \times d \leq 1000 \times d/p+600$ (i.e. below the line X in FIG. 3), it is possible to surely obtain the light transmission of not lower than 0.8 by setting the retardation at $\Delta n \times d \leq 1000 \times d/p+500$ (i.e. below the line Y in FIG. 3), and it is possible to surely obtain the light transmission of not lower than 0.9 by setting the retardation at $\Delta n \times d \leq 1000 \times d/p+450$ (i.e. below the line Z in FIG. 3).

Therefore, in case where $0.28 \leq d/p \leq 0.40$, for example, it is possible to surely obtain the light transmission of not lower than 0.7 by setting the retardation at $1000 \times d/p+50 \leq \Delta n \times d \leq 1000 \times d/p+600$ (i.e. above the line U and below the line X in FIG. 3), it is possible to surely obtain the light transmission of not lower than 0.8 by setting the retardation at $1000 \times d/p+100 \leq \Delta n \times d \leq 1000 \times d/p+500$ (i.e. above the line V and below the line Y in FIG. 3), and it is possible to surely obtain the light transmission of not lower than 0.9 by setting the retardation at $1000 \times d/p+150 \leq \Delta n \times d \leq 1000 \times d/p+450$ (i.e. above the line W and below the line Z in FIG. 3).

Also, as shown in FIG. 3, in the range of $0.30 \leq d/p \leq 0.40$ or in the range of $0.30 \leq d/p \leq 0.35$, it is possible to obtain the light transmission of not lower than 0.8 by setting the retardation at $\Delta n \times d \leq 1000 \times d/p+600$ (below the line X in FIG. 3), it is possible to surely obtain the light transmission of not lower than 0.8 by setting the retardation at $\Delta n \times d \leq 1000 \times d/p+500$ (below the line Y in FIG. 3), and it is possible to surely obtain the light transmission of not lower than 0.9 by setting the retardation at $\Delta n \times d \leq 1000 \times d/p+450$ (below the line Z in FIG. 3).

Therefore, in the range of $0.30 \leq d/p \leq 0.40$ or in the range of $0.30 \leq d/p \leq 0.35$, for example, it is possible to obtain the light transmission of not lower than 0.8 by setting the retardation at $1000 \times d/p+100 \leq \Delta n \times d \leq 1000 \times d/p+600$ (i.e. above the line V and below the line X in FIG. 3), more preferably at $1000 \times d/p+100 \leq \Delta n \times d \leq 1000 \times d/p+500$ (i.e. above the line V and below the line Y in FIG. 3), it is possible to surely obtain the light transmission of not lower than 0.8 by setting the retardation at $1000 \times d/p+150 \leq \Delta n \times d \leq 1000 \times d/p+450$ (i.e. above the line W and below the line Y in FIG. 3), and it is possible to surely obtain the light transmission of not lower than 0.9 by setting the retardation at $1000 \times d/p+150 \leq \Delta n \times d \leq 1000 \times d/p+450$ (i.e. above the line W and below the line Z in FIG. 3).

It is noted that the aforesaid ranges of d/p and $\Delta n \times d$ may be properly combined to achieve a more preferable range.

(Verification)

The following will describe verification of the liquid crystal display element 31 of Embodiment 1.

(Verification 1)

Table 1 shows the evaluations of display irregularity in a liquid crystal display element 31 in which the thickness (cell thickness) d of the liquid crystal layer 4 is set at about 5.5 μm and the chiral pitch length p of the liquid crystal material is set at 18 μm. The table shows the results of two cases: both of the alignment films 34 and 35 sandwiching the liquid crystal were rubbed (panel 1-1); and only one of these films was rubbed (panel 1-2).

The chiral pitch length of the liquid crystal material was adjusted by changing an amount of chiral material added to the liquid crystal material. Table 1 shows the result of evaluation in room temperatures, in case where the alignment films 34 and 35 were RN-783 (product name) of Nissan Chemical Industries, Ltd., the liquid crystal material of the liquid crystal layer 4 was MJ941296 (product name) ($\Delta n=0.0804$, $\Delta \in = -4$) of Merck Ltd., the chiral material added to the liquid crystal layer 4 was S-811 (product name) of Merck Ltd., and the polarizing plates 12 and 13 were G1220DU (product name) of Nitto Denko Corporation.

The display irregularity was evaluated in the following manner: First, each of the test panels (panels 1-1 and 1-2) was placed on a backlight. Subsequently, onto the entirety of the display screen of the panel 1-1 (1-2), a uniform voltage was applied to the electrode (transparent electrode 6 (9)) of the panel 1-1 (1-2). In this way, the liquid crystal molecules of the liquid crystal layer 4 were operated. Thereafter, an amount of light passing through the panel 1-1 (1-2) was adjusted, and the distribution of the light passed through the display screen of the panel 1-1 (1-2) was observed by human eyes.

Table 2 shows the symbols in the items of the display irregularity in Table 1 and the degrees of the display irregularity. The display irregularity 1 indicates the result of eye observation of the distribution of light having passed through the display screen in case where the transmitted light of the liquid crystal display element (panel 1-1 or 1-2) as a test panel was relatively bright. The display irregularity 2 indicates the result of eye observation of the distribution of light having passed through the display screen in case where the transmitted light of the liquid crystal display element (panel 1-1 or 1-2) was relatively dark.

TABLE 1

|  | PANEL | |
| --- | --- | --- |
|  | 1-1 | 1-2 |
| d(μm) | 5.50 | 5.55 |
| p(μm) | 18 | 18 |
| d/p | 0.306 | 0.308 |
| DEGREE OF DISPLAY IRREGULARITY 1 | A | A |
| DEGREE OF DISPLAY IRREGULARITY 2 | B | A |

TABLE 2

|  | SYMBOLS IN TABLE 1 | |
| --- | --- | --- |
|  | B | A |
| DEGREE OF DISPLAY IRREGULARITY 1 | RARELY OBSERVABLE | NOT OBSERVABLE |
| DEGREE OF DISPLAY IRREGULARITY 2 | RARELY OBSERVABLE | NOT OBSERVABLE |

According to Table 1 and Table 2, the display irregularity 1 was not observable and the display irregularity 2 was rarely observable on the panel 1-1. On the panel 1-2, neither the display irregularity 1 nor the display irregularity 2 was observable. This indicates that the display irregularity was restrained by arranging only one of the alignment films 34 and 35 to be uniaxial-aligned.

To evaluate the dispersion of pre-tilt angles in each of the panel 1-1 and panel 1-2, a liquid crystal cell for the measurement of pre-tilt angles was produced for each of the panels 1-1 and 1-2. The liquid crystal cell for the panel 1-1 and the liquid crystal cell for the panel 1-2, which were used for the evaluation of the pre-tilt angles, were identical in the rubbing direction of the alignment films 34 and 35 but were different in that both of the alignment films 34 and 35 were rubbed in the liquid crystal cell for the panel 1-1 whereas only one of the alignment films 34 and 35 was rubbed in the liquid crystal cell for the panel 1-2. Processes other than the above were identical therebetween. Each of these liquid crystal cells for the evaluation of the pre-tilt angles was arranged such that the rubbing directions of the respective alignment films 34 and 35 of two substrates (first substrate 32 and second substrate 33) sandwiching the liquid crystal layer 4 were in reverse to one another.

The measurement of the pre-tilt angles was carried out using PAS-301 (product name) which was a pre-tilt angle measurement system made by Toyo Corporation. The measurement of the pre-tilt angles was carried out in plural parts of the display screen of each liquid crystal cell, and in what range the measured pre-tilt angles in the display screen of each liquid crystal cell fell was evaluated.

As a result of the evaluation of the pre-tilt angles, it was found that the pre-tilt angles of the liquid crystal cells for the panels 1-1 and 1-2 always fell within the range of θpmax-θpmin≦3.0°, assuming that the maximum pre-tilt angle was θpmax and the minimum pre-tilt angle was θpmin. The cell thickness of each liquid crystal cell was measured using RETS-1200 (product name) made by Otsuka Electronics Co. Ltd.

In this way, as shown in Tables 1 and 2, it was found that the display irregularity was restrained and uniform and good display characteristics were achieved by, as in the case of the panels 1-2, uniaxial-aligning only one of the two alignment films 34 and 35 sandwiching the liquid crystal layer 4 in the liquid crystal display element 31 of this verification.

(Verification 2)

Table 3 shows the result of evaluation of relative transmittance and display irregularity in each of liquid crystal display elements 31 (panels 2-1 and 2-2, in which only one of the substrate was rubbed) in which d/p were set so as to be substantially identical (0.31) but Δn×d were different therebetween. The thickness d of the liquid crystal layer was adjusted by changing the height of the spacer 36 of each of the panels 2-1 and 2-2.

Table 3 shows the result of evaluation in room temperatures, in case where the alignment films 34 and 35 were RN-783 (product name) of Nissan Chemical Industries, Ltd., the liquid crystal material of the liquid crystal layer was MJ941296 (product name) of Merck Ltd., the chiral material added to the liquid crystal layer 4 was S-811 (product name) of Merck Ltd., and the polarizing plates 12 and 13 were G1220DU (product name) of Nitto Denko Corporation.

The transmittance was calculated in such a manner that a light amount T0 of the backlight which was the light source was measured, and then a light amount T1 of light passing through each of the panels 2-1 and 2-2 on the backlight was measured. In this case, the transmittance (T) was defined as T=T1/T0. In Table 3, a relative transmittance calculated by dividing the transmittance of the panel 2-1 by the transmittance of the panel 2-2 is shown.

TABLE 3

|  | PANEL | |
| --- | --- | --- |
|  | 2-1 | 2-2 |
| d(μm) | 6.41 | 5.55 |
| p(μm) | 20 | 18 |
| d/p | 0.319 | 0.308 |
| Δn × d(nm) | 515 | 446 |
| RELATIVE TRANSMITTANCE | 1.1 | 1.0 |
| DEGREE OF DISPLAY IRREGULARITY 1 | A | A |
| DEGREE OF DISPLAY IRREGULARITY 2 | A | A |

According to Table 3, a comparison between the panel 2-1 and the panel 2-2 shows that, while d/p was close to 0.31 in both panels, the transmittance of the panel 2-1 (Δn×d=515 nm) was higher by around 10% than the transmittance of the panel 2-2 (Δn×d=446 nm).

In this way, as shown in Table 3, high transmittance and good display quality were achieved in the liquid crystal display element 31 of the verification 2 of the present invention, by setting d/p≈0.31 and Δn×d≈515.

Embodiment 2

The following will describe another embodiment of the present invention with reference to FIG. 9, FIG. 10(a), FIG. 10(b), and FIG. 10(c). In the present embodiment, components having the same functions as with the Embodiment 1 will be given the same reference numerals, and explanation thereof is omitted. The present invention will deal with differences from Embodiment 1 above.

As discussed above, in case where only one of the alignment films 34 and 35 of two substrates (first substrate 32 and second substrate 33) sandwiching the liquid crystal layer 4 has been uniaxial-rubbed (i.e. one-sided rubbing), the director of the liquid crystal in the liquid crystal layer 4 is consecutive and gradual twisted, and hence the change in the alignment of the liquid crystal molecules in response to a change in the electric field applied to the liquid crystal layer 4 is smoothly carried out. It is therefore possible to absorb the variation in the light transmission due to the dispersion of the pre-tilt angles, and hence the overall display irregularity on the display screen is restrained. In this way, as a result of one-sided rubbing of the alignment films 34 and 35, it is possible to obtain a liquid crystal display element 31 in which the overall display irregularity is restrained (improved) and the display quality is improved in comparison with the case of rubbing (both-sided rubbing) of the alignment films 34 and 35. However, when the overall display irregularity is restrained (improved), minor partial irregularity, which has been unnoticed, becomes conspicuous. Such partial display irregularity is observed along the source lines or gate lines. Partial display irregularity is not very conspicuous for human eyes observing the entire display screen, but is found when each pixel 61 is magnified by an electron microscope or the like.

The present embodiment therefore deals with a liquid crystal display element 31 in which not only the overall display irregularity on the display screen is restrained (improved) but also partial irregularity observed along the source lines or gate lines, which occurs on account of the suppression (improvement) of the overall display irregularity, is restrained.

The liquid crystal display element 31 of the present embodiment, which is shown in FIG. 9, is different from the liquid crystal display element 31 of Embodiment 1 in that the first substrate is an active matrix substrate and the rubbing direction is in parallel to the source lines 50 or the gate lines 51. This rubbing in parallel to the source lines 50 or the gate lines 51 makes it possible to prevent, as discussed above, the partial irregularity observed along the source lines or gate lines. The rubbing direction, however, is not necessarily in parallel to the source lines 50 or the gate lines 51. The smaller the angle between the source lines 50 or the gate lines 51 and the rubbing direction is, the more the partial display irregularity observed along the source lines or the gate lines is restrained. Details are as follows.

The liquid crystal display element 31 of the present embodiment includes a first substrate 32 and a second substrate 33. The first substrate 32 (active matrix substrate) has pixels 61 which are provided in a matrix manner, and each of the pixels 61 is provided with an active element (not illustrated) such as TFT. On the other hand, the second substrate 33 is a color filter substrate, on which a color filter (not illustrated) is formed.

As shown in FIG. 9, the first substrate 32 has vertical source lines 50 and horizontal gate lines 51 which are orthogonal to the source lines 50, respectively. On the first substrate 32, areas which are circumscribed by the source lines 50 and the gate lines 51 are the pixels 61. Only the first substrate 32, which is an active matrix substrate, has been rubbed.

(Evaluation Results)

The following will describe the results of evaluation of the liquid crystal display element 31 of Embodiment 2.

More specifically, the following will provide the results of comparisons between the display irregularity of the liquid crystal display element 31 and those of liquid crystal display elements 31 with variously different rubbing directions. In addition to this, the following will also explain the dispersion of pre-tilt angles and the display irregularity around the wires formed on the first substrate 32 which is an active matrix substrate.

The liquid crystal display element 31 for the evaluation was arranged as below.

The thickness (cell thickness: d) of the liquid crystal layer 4 sandwiched between the first substrate 32 and the second substrate 33 was about 4.90 (4.88 to 4.92) μm. The liquid crystal layer 4 was constituted by a liquid crystal material and a chiral material added to the liquid crystal material. The liquid crystal material was MJ941296 (product name) (Δn=0.0804, Δ∈=−4) of Merck Ltd., and the chiral material was S-811 (product name) also of Merck Ltd. This liquid crystal display element 31 was arranged to have d/p of 0.3.

To the inner surfaces (facing the liquid crystal layer) of the first substrate 32 and the second substrate 33, RN-783 (product name) of Nissan Chemical Industries, Ltd. was applied so that alignment films 34 and 35 were formed thereon.

Among the alignment films, only the alignment film 34 on the first substrate 32 which is an active matrix substrate was rubbed.

For the evaluation, liquid crystal display elements 31 (panels 3-1 through 3-5) with respective rubbing directions as shown in Table 4 were used.

The panel 3-5 was a liquid crystal display element 31 which included an active matrix substrate which was the first substrate 32 rubbed in the direction in parallel to the gate lines 51 (i.e. the direction A in FIG. 9; hereinafter, gate line direction). Provided that the gate line direction was 0° and the direction in parallel to the source lines 50 (i.e. the direction E in FIG. 9; hereinafter, source line direction) was 90°, the panel 3-2 was a liquid crystal display element 31 which included an active matrix substrate which was rubbed in the direction (5° direction; the direction B in FIG. 9) forming an angle of 5° with the gate line direction. Similarly, as liquid crystal display elements 31, the panel 3-3 was rubbed in the 45° direction (the direction C in FIG. 9), the panel 3-4 was rubbed in the 85° direction (the direction D in FIG. 9), and the panel 3-5 was rubbed in the source line direction (the 90° direction; the direction A in FIG. 9), in terms of the rubbing direction of active matrix substrate.

To the outer surfaces (which did not face the liquid crystal layer 4) of the first substrate 32 and the second substrate 33, plates of G1220DU (product name) made by Nitto Denko Corporation were attached as polarizing plates 12 and 13.

(Method of Evaluation of Display Irregularity)

The evaluation of the display irregularity was carried out as follows: As shown in Table 4, each of liquid crystal display elements 31 with respective rubbing directions was placed on the backlight, a uniform voltage was applied to electrodes on the entirety of the display screen of the liquid crystal display element 31 so that the liquid crystal molecules of the liquid crystal layer 4 were operated, and then the distribution of brightness (differences in transmittance) of light which passed through the display screen of each liquid crystal display element 31 was observed by human eyes, while an amount of transmitted light of each liquid crystal display element 31 was adjusted.

Figure 10A:
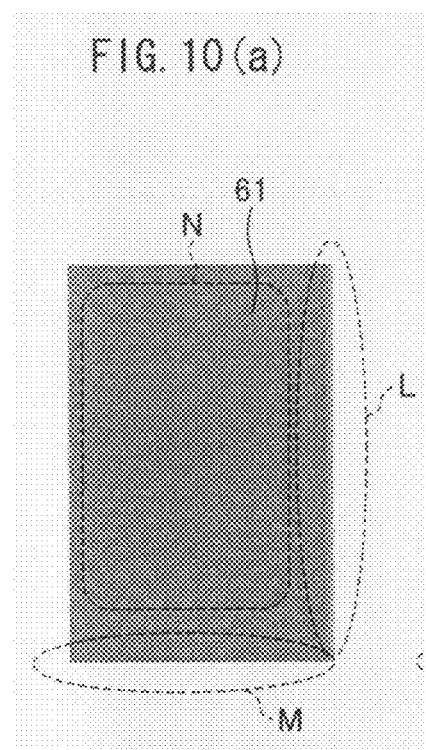
FIG. 10(*a*) shows how transmittance of a pixel is different when the direction of rubbing is different.
Figure 10B:
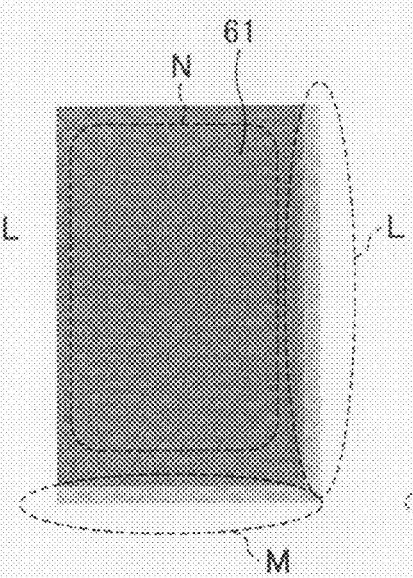
Figure 10C:
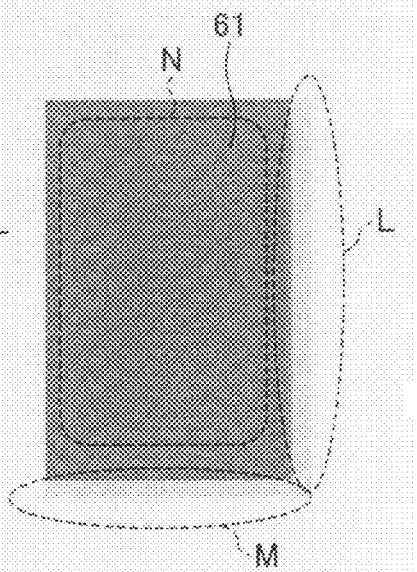

Also, the inside of the pixel 61 was observed by using a microscope, while the transmittance was fixed at 50%. The results are shown in FIG. 10(a) to FIG. 10(c). The observation using the microscope was, as shown in FIG. 10(a) to FIG. 10(c), performed in such a way that, in each pixel constituting the display screen of the liquid crystal display element 31, a difference in the transmittance was observed between (i) an area (L in FIGS. 10(a)-10(c)) around the long edge and an area (M in FIGS. 10(a)-10(c)) around the short edge and (ii) the central area (N in FIGS. 10(a)-10(c)) of the pixel 61. The evaluation was carried out at room temperatures.

TABLE 4

| PANEL | RUBBING ANGLE | DISPLAY IRREGU-LARITY | FIGURE OF PIXELS | TILT L AROUND WIRES | TILT M AROUND WIRES |
| --- | --- | --- | --- | --- | --- |
| 3-1 | 0° | A | a | 86.6° | 87.2° |
| 3-2 | 5° | B | b | 84.9° | 85.1° |
| 3-3 | 45° | C | c | 84.1° | 84.3° |
| 3-4 | 85° | B | b | 85.1° | 84.8° |
| 3-5 | 90° | A | a | 87.5° | 87.3° |

(Result of Evaluation)

Table 4 shows the result of the evaluation. In Table 4, each of "A", "B", and "C" indicates the degree of relative display irregularity, and "A" indicates that display irregularity was not observed even by the observation using a microscope. "C" indicates that while overall display irregularity was restrained, partial display irregularity around the wires was conspicuous as a result of the observation by using a microscope, as compared to the other panels.

Furthermore, in Table 4, figures of pixels a, b, and c indicate the display states of the pixels 61 as a result of the observation by a microscope, and correspond to the pixels 61 of FIG. 10(a), FIG. 10(b), and FIG. 10(c), respectively.

As shown in Table 4, the figure of pixel observed in the panel 3-3 (whose rubbing direction was C in FIG. 9) is shown in FIG. 10(c). When the rubbing direction was 45° as in the case of the panel 3-3, no display irregularity was observed at the central part (N) of the pixel, but display irregularity around the wires (in areas L and M) was relatively conspicuous as a result of the observation by a microscope, in comparison with the panels 3-1, 3-2, 3-4, and 3-5.

In the meanwhile, as shown in Table 4, in the panel 3-2 (whose rubbing direction was B in FIG. 9) and the panel 3-4 (whose rubbing direction was D in FIG. 9), the figure of observed pixel was shown in FIG. 10(*b*). In these panels, display irregularity was rarely observed.

In the panel 3-1 (whose rubbing direction was in parallel to the gate line direction) and the panel 3-5 (whose rubbing direction was in parallel to the source line direction), the figures of the observed pixels were shown in FIG. 10(*a*). In these panels, display irregularity was rarely observed.

In this way, it is possible to understand that the display irregularity in the pixels 61 is meticulously prevented, when the rubbing direction in the first substrate 32 is in parallel to the source lines 50 or the gate lines 51.

That is to say, in the liquid crystal display element 31 of the present embodiment, only the first substrate 32 has been rubbed, and hence overall display irregularity of the pixels 61 is restrained. However, when the overall display irregularity is restrained and a clear image is obtained, partial display irregularity around the wires (in areas L and M) becomes conspicuous, although it was not perceptible before. Such partial display irregularity around the wires can be observed by using a microscope as discussed above, and the display quality can be further improved by restraining such partial display irregularity as in the cases of the panels 3-2 and 3-4, preferably as in the cases of the panels 3-1 and 3-5.

(Relationship between Display Irregularity and Pre-Tilt Angle)

The tilt L around the wires and the tilt M around the wires in Table 4 indicate the pre-tilt angle around the long edge (i.e. in the area L in FIGS. 10(*a*)-10(*c*)) of the pixel 61 and the pre-tilt angle around the short edge (i.e. in the area M in FIGS. 10(*a*)-10(*c*)) of the pixel 61, respectively. At the central part (area N in FIGS. 10(*a*)-10(*c*)), of the pixel 61, the pre-tilt angle was about 87° in all of the panels.

As shown in Table 4, in the display elements 31 (panel 3-1 through panel 3-5) of the present embodiment, a difference (in the pre-tilt angles in the display screen) between the pre-tilt angle (87°) at the central part (area N) of the pixel 61 and the pre-tilt angles (tilts M and L around the wires) around the wires (in the areas L and M) was not larger than ±3° in all of the panels. Also, it has been found from the evaluation result above that the display irregularity correlates with the pre-tilt angles. In other words, the display irregularity is severe when a difference between the pre-tilt angles in the display screen is large, whereas the display irregularity is small when a difference between the pre-tilt angles in the display screen is small.

As discussed above, the liquid crystal display element of the present invention, includes a pair of substrates on whose opposing surfaces alignment films are formed, respectively; and a material layer having dielectric anisotropy, the material layer being sandwiched between said pair of substrates, aligning capability being imparted only one of the alignment films so that a liquid crystal material has pre-tilt angles, the material layer with the dielectric anisotropy including a chiral material and the liquid crystal material with a nematic liquid crystalline phase, $0.25 \leq d/p \leq 0.50$ being satisfied assuming that the thickness of the material layer is d and a chiral pitch length of the liquid crystal material is p, and $1000 \times d/p \leq \Delta n \times d$ being satisfied assuming that refractive index anisotropy of the liquid crystal material is $\Delta n$. Therefore, in the present invention, even if the pre-tilt angles of the alignment film are dispersed, a variation in an amount of transmitted light due to the dispersion of the pre-tilt angles of the alignment film is restrained and hence display characteristics with restrained display irregularity are achieved. Furthermore, it is possible to realize a liquid crystal display element in a twisted alignment mode, which excels in light transmission. It is noted that $\Delta n \times d$ indicates so-called retardation, and is, in the present invention, a marker of the brightness of a liquid crystal display element.

For example, the d/p preferably falls within the range of $0.28 \leq d/p \leq 0.40$, and more preferably falls within the range of $0.30 \leq d/p \leq 0.35$.

In the liquid crystal display element of the present invention, $1000 \times d/p + 50 \leq \Delta n \times d$ is preferably satisfied and more preferably $1000 \times d/p + 100 \leq \Delta n \times d$ is satisfied, assuming that the thickness of the material layer having the dielectric anisotropy is d, the chiral pitch length of the liquid crystal material is p, and the refractive index anisotropy of the liquid crystal material is $\Delta n$.

In the liquid crystal display element of the present invention, the upper limit of the $\Delta n \times d$ is not particularly determined. Preferably, however, not only the lower limit but also the upper limit of the $\Delta n \times d$ are predetermined. In addition to the above, the $\Delta n \times d$ preferably satisfies, for example, $\Delta n \times d \leq 1000 \times d/p + 600$, more preferably satisfies $\Delta n \times d \leq 1000 \times d/p + 500$, and even more preferably satisfies $\Delta n \times d \leq 1000 \times d/p + 450$.

For example, the liquid crystal display element of the present invention may satisfy $0.28 \leq d/p \leq 0.45$ and $1000 \times d/p + 50 \leq \Delta n \times d \leq 1000 \times d/p + 600$.

The liquid crystal display element of the present invention may satisfy $1000 \times d/p + 100 \leq \Delta n \times d 1000 \times d/p + 500$.

The liquid crystal display element of the present invention may satisfy $1000 \times d/p + 150 \leq \Delta n \times d 1000 \times d/p + 450$.

The liquid crystal display element of the present invention may satisfy $0.30 \leq d/p \leq 0.40$ and $1000 \times d/p + 100 \leq \Delta n \times d \leq 1000 \times d/p + 600$.

As discussed above, the intensity of transmitted light may be decreased even if a variation in an amount of the transmitted light due to the variation in d/p is restrained, when only the range of the d/p is determined as above (for example, $0.25 \leq d/p \leq 0.50$, $0.28 \leq d/p \leq 0.45$, $0.28 \leq d/p \leq 0.40$, $0.30 \leq d/p \leq 0.40$, and $0.30 \leq d/p \leq 0.35$). Therefore, it is possible to prevent the decrease in an amount of the transmitted light by setting the range of the retardation to fall within the aforesaid predetermined range.

More specifically, in case where $0.25 \leq d/p \leq 0.50$ is satisfied, it is possible to obtain the light transmission of not lower than 0.6 if $1000 \times d/p \leq \Delta n \times d$ is satisfied, it is possible to obtain the light transmission of not lower than 0.7 if $1000 \times d/p + 50 \leq \Delta n \times d$ is satisfied, and it is possible to obtain the light transmission of not lower than 0.8 if $1000 \times d/p + 100 \leq \Delta n \times d$ is satisfied.

Furthermore, in case where $0.25 \leq d/p \leq 0.50$ is satisfied, it is possible to surely obtain the light transmission of not lower than 0.6 when $1000 \times d/p \leq \Delta n \times d \leq 1000 \times d/p + 600$ is satisfied, it is possible to surely obtain the light transmission of not lower than 0.7 if $1000 \times d/p + 50 \leq \Delta n \times d \leq 1000 \times d/p + 500$ is satisfied, and it is possible to surely obtain the light transmission of not lower than 0.8 if $1000 \times d/p + 100 \leq \Delta n \times d \leq 1000 \times d/p + 450$ is satisfied.

Furthermore, in case where $0.28 \leq d/p \leq 0.45$ is satisfied, it is possible to surely obtain the light transmission of not lower than 0.7 when $1000 \times d/p + 50 \leq \Delta n \times d \leq 1000 \times d/p + 600$ is satisfied, it is possible to surely obtain the light transmission of not lower than 0.8 when, $1000 \times d/p + 100 \leq \Delta n \times d 1000 \times d/p + 500$ is satisfied, and it is possible to surely obtain the light transmission of not lower than 0.9 when $1000 \times d/p + 150 \leq \Delta n \times d 1000 \times d/p + 450$ is satisfied.

It is possible to further surely obtain the light transmission of not lower than 0.8 when $0.30 \leq d/p \leq 0.40$ and $1000 \times d/p + 100 \leq \Delta n \times d \leq 1000 \times d/p + 600$ are satisfied.

The aforesaid liquid crystal display element of the present invention may be arranged such that, in a display area, a range of dispersion of the pre-tilt angles of the liquid crystal material falls within ±3° of the median of the pre-tilt angles.

The aforesaid liquid crystal display element of the present invention may be arranged such that, the median of the pre-tilt angles is 87°

In the arrangements above, the liquid crystal material in the display area has pre-tilt angles. A pre-tilt angle is an initial angle of the director of the liquid crystal molecules with respect to the surface of substrate, when no voltage is applied thereto. The liquid crystal material sandwiched between the substrates whose alignment film has been rubbed is aligned not in the same direction but in slightly different directions, when no voltage is applied. In other words, the pre-tilt angles are dispersed in the whole liquid crystal material. This is a problem inherent in the process, and hence it is difficult to restrain such dispersion.

In the aforesaid liquid crystal display element, the range of dispersion of the pre-tilt angles may fall within ±3° of the median of the pre-tilt angles of the liquid crystal material in the display area. The pre-tilt angle may be set at, for example, 87°. In this case, the liquid crystal material is dispersed within 87°±3°, and hence $84° \leq \theta p \leq 90°$ is satisfied provided that the pre-tilt angles are indicated by θp.

The aforesaid liquid crystal display element of the present invention may be arranged such that, on one of said pair of substrates, a layer thickness control member for keeping the material layer to have a predetermined thickness is provided, and the aligning capability is imparted to a surface of the alignment film on the other one of said pair of substrates.

In this arrangement, the alignment film where the layer thickness control member is provided does not have the aligning capability, and the aligning capability is imparted to the surface of the alignment film on the other substrate. When the layer thickness control member is provided, the surface of the alignment film is not flat but irregular. Therefore, when the aligning capability is imparted to the alignment film where the layer thickness control member is provided, the precision of the aligning is decreased on account of the irregularity of the layer thickness control member, and this induces display irregularity.

In this regard, it is possible to prevent this display irregularity from occurring by imparting the aligning capability only to the alignment film on the substrate where the layer thickness control member is not provided. Furthermore, since the manufacturing process is simplified, the yield is improved.

The aforesaid liquid crystal display element of the present invention may be arranged such that, the liquid crystal material exerts optical isotropy when no electric field is applied thereto, and the liquid crystal material exerts optical anisotropy when an electric field is applied thereto.

By this arrangement, it is possible to realize a so-called normally-black liquid crystal display element which blocks light when no electric field is applied and let light pass through when an electric field is applied. On account of very high contrast, a normally-black liquid crystal display element is prone to display irregularity due to a variation in an amount of transmitted light. Such display irregularity can be avoided by the arrangement disclosed by the present invention.

The aforesaid liquid crystal display element of the present invention may be arranged such that the alignment film are vertical alignment films, and the liquid crystal material is a liquid crystal material with negative dielectric anisotropy.

This makes it possible to manufacture a normally-black liquid crystal display element, and images with good quality and small display irregularity are displayable by a high-contrast liquid crystal display element.

The aforesaid liquid crystal display element of the present invention may be arranged such that externally-incident light is transmittable from one of said pair of substrates to the other one of said pair of substrates.

In this arrangement, since externally-incident light is transmissible, it is possible to manufacture a transmissive liquid crystal display element.

The aforesaid liquid crystal display element of the present invention may be arranged such that at least one of said pair of substrates is an active matrix substrate having source lines, the aligning capability is imparted to a surface of the alignment film on the active matrix substrate, and the aligning capability is imparted by rubbing, and the direction of the rubbing is in parallel to the source lines of the active matrix substrate.

The aforesaid liquid crystal display element of the present invention may be arranged such that at least one of said pair of substrates is an active matrix substrate having gate lines, the aligning capability is imparted to a surface of the alignment film on the active matrix substrate, and the aligning capability is imparted by rubbing, and the direction of the rubbing is in parallel to the gate lines of the active matrix substrate.

This makes it possible to restrain defective image display along the source lines or gate lines, which occurs because there is inescapably an area where the pre-tilt angles do not fall within the range of ±3° of the median, for the reason that the pre-tilt angles around the source lines or gate lines are not controllable by a conventional rubbing method (obliquely passing across the wires) due to influences of irregularity in the height of wires or the like.

More specifically, in an active matrix substrate, source lines and gate lines are formed in the vertical direction and in the horizontal direction, respectively. Therefore, in this substrate, the surface of the alignment film thereon is irregular. A conventional rubbing is conducted in the direction forming an angle of substantially 45° with the source lines and gate lines. In other words, the conventional rubbing is conducted to obliquely pass across the source lines and gate lines. In this case, around the source lines or gate lines, it is difficult to set the pre-tilt angles at a desired angle on account of irregularity in the height of wires or the like, and hence it is difficult to restrain the dispersion within ±3° of the median as above. This is the reason why display irregularity occurs along the source lines or gate lines.

In this regard, in the liquid crystal display element of the present invention, the rubbing is conducted in the direction in parallel to the source lines or gate lines. Therefore, an influence of irregularity in the height of wires is small and hence it is easy to control the dispersion of the pre-tilt angles to be within the range of ±3° of the median of the pre-tilt angles.

It is therefore possible to restrain the occurrence of display irregularity along the source lines or gate lines, and hence the display quality is further improved.

Examples of methods for ex-post assessment of whether the rubbing has been conducted in a desired direction include a method in which the optical anisotropy of the surface of the alignment film is measured and a method in which the surface is observed using an atomic force microscope (AFM). An example of the equipment for measuring the optical anisotropy is PI-Checker of Toyo Corporation, which is a liquid crystal alignment film evaluation system.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The liquid crystal display element of the present invention is a liquid crystal display element in a vertical alignment mode and can restrain the display irregularity and excels in light transmission. The liquid crystal display element can therefore be widely used for image display apparatuses such as television receivers and monitors and also image display apparatuses of OA equipments such as word processors and personal computers and information terminals such as video cameras, digital cameras, and mobile phones. In this way, the present invention is suitably used in various industrial fields requiring displays, such as consumer electronics and mechanical industry.

The invention claimed is:

1. A liquid crystal display element, comprising:
a pair of substrates on whose opposing surfaces alignment films are formed, respectively; and
a material layer having dielectric anisotropy, the material layer being sandwiched between said pair of substrates,
wherein only one of the alignment films is rubbed so that a liquid crystal material has pre-tilt angles,
the material layer with the dielectric anisotropy includes a chiral material and the liquid crystal material with a nematic liquid crystalline phase,
$0.25 \leq d/p \leq 0.50$ being satisfied assuming that the thickness of the material layer is d and a chiral pitch length of the liquid crystal material is p,
$1000 \times d/p \leq \Delta n \times d$ is satisfied assuming that refractive index anisotropy of the liquid crystal material is $\Delta n$,
in a display area, a range of dispersion of the pre-tilt angles of the liquid crystal material falls within $\pm 3°$ of a median of the pre-tilt angles,
wherein at least one of said substrates is an active matrix substrate comprising source lines, gate lines, and/or both of source lines and gate lines, and
wherein an absolute value of difference between the pre-tilt angle of the liquid crystal material around any of the source and gate lines and the median of the pre-tilt angles, which is approximately 87 degrees, of the liquid crystal material in the display area is less than 0.5 degrees.

2. The liquid crystal display element as defined in claim 1, wherein, the d/p satisfies $0.28 \leq d/p \leq 0.40$.

3. The liquid crystal display element as defined in claim 1, wherein, the d/p satisfies $0.30 \leq d/p \leq 0.35$.

4. The liquid crystal display element as defined in claim 1, wherein, $1000 \times d/p + 100 \leq \Delta n \times d$ is satisfied.

5. The liquid crystal display element as defined in claim 1, wherein, $\Delta n \times d \leq 1000 \times d/p + 600$ is satisfied.

6. The liquid crystal display element as defined in claim 3, wherein, $1000 \times d/p + 150 \leq \Delta n \times d \leq 1000 \times d/p + 450$ is satisfied.

7. The liquid crystal display element as defined in claim 1, wherein, $\Delta n \times d \leq 2500 \times d/p + 150$ and $\Delta n \times d \leq -1750 \times d/p + 1750$ are satisfied.

8. The liquid crystal display element as defined in claim 1, wherein, $\Delta n \times d$ is not higher than 900 nm.

9. The liquid crystal display element as defined in claim 1, wherein, $1500 \times d/p \leq \Delta n \times d$, $\Delta n \times d \leq 2500 \times d/p$, $\Delta n \times d \leq -1750 \times d/p + 1600$, and $\Delta n \times d \leq 900$ nm are satisfied.

10. The liquid crystal display element as defined in claim 1, wherein, on one of said pair of substrates, a layer thickness control member for keeping the material layer to have a predetermined thickness is provided, and
the other one of said substrates is rubbed.

11. The liquid crystal display element as defined in claim 1, wherein, the liquid crystal material exerts optical isotropy when no electric field is applied thereto, and the liquid crystal material exerts optical anisotropy when an electric field is applied thereto.

12. The liquid crystal display element as defined in claim 1, wherein, the alignment films are vertical alignment films.

13. The liquid crystal display element as defined in claim 1, wherein, the liquid crystal material is a liquid crystal material with negative dielectric anisotropy.

14. The liquid crystal display element as defined in claim 1, wherein, externally-incident light is transmittable from one of said pair of substrates to the other one of said pair of substrates.

15. The liquid crystal display element as defined in claim 1, wherein the alignment film on the active matrix substrate is rubbed, and
the direction of the rubbing is in parallel to the source lines of the active matrix substrate.

16. The liquid crystal display element as defined in claim 1, wherein the alignment film on the active matrix substrate is rubbed, and
the direction of the rubbing is in parallel to the gate lines of the active matrix substrate.

* * * * *